US009283432B2

(12) United States Patent
Marty et al.

(10) Patent No.: US 9,283,432 B2
(45) Date of Patent: Mar. 15, 2016

(54) TRAJECTORY DETECTION AND FEEDBACK SYSTEM

(71) Applicant: Pillar Vision, Inc., Menlo Park, CA (US)

(72) Inventors: Alan W. Marty, Menlo Park, CA (US); Thomas A. Edwards, Menlo Park, CA (US); Ridge McGhee, Redwood City, CA (US)

(73) Assignee: Pillar Vision, Inc., Athens, AL (US)

( * ) Notice: Subject to any disclaimer, the term of this patent is extended or adjusted under 35 U.S.C. 154(b) by 0 days.

(21) Appl. No.: 14/221,337

(22) Filed: Mar. 21, 2014

(65) Prior Publication Data

US 2014/0206479 A1 Jul. 24, 2014

Related U.S. Application Data

(63) Continuation of application No. 13/693,912, filed on Dec. 4, 2012, which is a continuation of application No. 12/015,445, filed on Jan. 16, 2008, now Pat. No. 8,409,024, which is a continuation-in-part of (Continued)

(51) Int. Cl.
*A63F 9/24* (2006.01)
*A63B 24/00* (2006.01)
(Continued)

(52) U.S. Cl.
CPC ......... *A63B 24/0021* (2013.01); *A63B 24/0003* (2013.01); *A63B 24/0084* (2013.01); *A63B 55/00* (2013.01); *A63B 69/0071* (2013.01); *A63B 69/3614* (2013.01); *A63B 69/3623* (2013.01); *A63B 69/38* (2013.01);
(Continued)

(58) Field of Classification Search
None
See application file for complete search history.

(56) References Cited

U.S. PATENT DOCUMENTS 420,788 A 2/1890 Hart
4,160,942 A 7/1979 Lynch et al.
(Continued)

FOREIGN PATENT DOCUMENTS

EP 0704715 A1 4/1996
FR 2710434 3/1995
(Continued)

OTHER PUBLICATIONS

Mullaney, Dave, "Free Throw Technique", The Athletic Journal for Nov. 1957, 53-55.

(Continued)

*Primary Examiner* — Paul A D'Agostino
(74) *Attorney, Agent, or Firm* — Maynard Cooper & Gale, P.C.; Jon E. Holland

(57) ABSTRACT

A disclosed device provides a trajectory detection and feedback system. The system is capable of detecting one or more moving objects in free flight, analyzing a trajectory of each object and providing immediate feedback information to a human that has launched the object into flight, and/or one or more observers in the area. In a particular embodiment, a non-intrusive machine vision system that remotely detects trajectories of moving objects may be used to evaluate trajectory parameters for a basketball shot at a basketball hoop by a player. The feedback information, such as a trajectory entry angle into the basketball hoop and/or an entry velocity into the hoop for the shot, may be output to the player in an auditory format using a sound projection device. The system may be operable to be set-up and to operate in a substantially autonomous manner.

25 Claims, 11 Drawing Sheets

Related U.S. Application Data application No. 11/508,004, filed on Aug. 21, 2006, now Pat. No. 7,854,669, which is a continuation-in-part of application No. 10/242,373, filed on Sep. 11, 2002, now Pat. No. 7,094,164.

(60) Provisional application No. 60/880,773, filed on Jan. 16, 2007, provisional application No. 60/323,029, filed on Sep. 12, 2001, provisional application No. 60/348,057, filed on Jan. 11, 2002, provisional application No. 60/395,875, filed on Jul. 12, 2002.

(51) Int. Cl.
*A63B 55/00* (2015.01)
*A63B 69/36* (2006.01)
*A63B 69/00* (2006.01)
*A63B 69/38* (2006.01)

(52) U.S. Cl.
CPC ....... *A63B2220/806* (2013.01); *A63B 2225/20* (2013.01); *A63B 2225/50* (2013.01)

(56) References Cited

U.S. PATENT DOCUMENTS

| | | | |
|---|---|---|---|
| 4,177,994 A | 12/1979 | Lindquist | |
| 4,337,049 A | 6/1982 | Connelly | |
| 4,375,674 A * | 3/1983 | Thornton | 702/41 |
| 4,545,576 A | 10/1985 | Harris | |
| 4,565,527 A | 1/1986 | Burchett | |
| 4,813,436 A * | 3/1989 | Au | 600/592 |
| 4,893,182 A | 1/1990 | Gautraud et al. | |
| 5,039,977 A | 8/1991 | Mele et al. | |
| 5,092,602 A | 3/1992 | Witler et al. | |
| 5,138,322 A | 8/1992 | Nuttall | |
| 5,210,603 A | 5/1993 | Sabin | |
| 5,303,924 A | 4/1994 | Kluttz et al. | |
| 5,342,041 A | 8/1994 | Agulnek et al. | |
| 5,342,051 A | 8/1994 | Rankin et al. | |
| 5,365,247 A | 11/1994 | Van der Veen et al. | |
| 5,365,427 A * | 11/1994 | Soignet et al. | 473/448 |
| 5,375,832 A | 12/1994 | Wilter et al. | |
| 5,398,936 A | 3/1995 | Kluttz et al. | |
| 5,413,345 A | 5/1995 | Nauck | |
| 5,471,383 A | 11/1995 | Gobush et al. | |
| 5,486,001 A | 1/1996 | Baker | |
| 5,489,099 A | 2/1996 | Rankin et al. | |
| 5,489,886 A | 2/1996 | Wexler et al. | |
| 5,507,485 A | 4/1996 | Fisher | |
| 5,515,378 A | 5/1996 | Roy et al. | |
| 5,542,988 A | 8/1996 | Bogus | |
| 5,562,550 A | 10/1996 | Chartrand | |
| 5,566,934 A | 10/1996 | Black et al. | |
| 5,577,733 A * | 11/1996 | Downing | F41J 5/02 250/222.2 |
| 5,697,791 A | 12/1997 | Nashner et al. | |
| 5,768,151 A | 6/1998 | Lowy et al. | |
| 5,798,519 A * | 8/1998 | Vock et al. | 250/206.1 |
| 5,846,086 A * | 12/1998 | Bizzi et al. | 434/247 |
| 5,868,578 A | 2/1999 | Baum | |
| 5,879,246 A | 3/1999 | Gebhardt et al. | |
| 5,882,269 A | 3/1999 | Lewis | |
| 5,938,545 A | 8/1999 | Cooper et al. | |
| 6,072,504 A * | 6/2000 | Segen | 345/474 |
| 6,073,086 A | 6/2000 | Marinelli | |
| 6,093,923 A | 7/2000 | Vock et al. | |
| 6,095,928 A | 8/2000 | Goszyk | |
| 6,133,946 A | 10/2000 | Cavallaro et al. | |
| 6,142,437 A | 11/2000 | Wilkins, Jr. | |
| 6,148,271 A | 11/2000 | Marinelli | |
| 6,151,563 A | 11/2000 | Marinelli | |
| 6,157,898 A | 12/2000 | Marinelli | |
| 6,179,720 B1 | 1/2001 | Rankin et al. | |
| 6,196,932 B1 | 3/2001 | Marsh et al. | |
| 6,285,445 B1 | 9/2001 | Winfield et al. | |
| 6,289,167 B1 | 9/2001 | Boetje et al. | |
| 6,304,665 B1 | 10/2001 | Cavallaro et al. | |
| 6,320,173 B1 | 11/2001 | Vock et al. | |
| 6,389,368 B1 | 5/2002 | Hampton | |
| 6,396,041 B1 | 5/2002 | Vock et al. | |
| 6,398,670 B1 | 6/2002 | Engelhardt et al. | |
| 6,430,997 B1 | 8/2002 | French et al. | |
| 6,488,591 B1 | 12/2002 | Gobush et al. | |
| 6,500,073 B1 | 12/2002 | Gobush et al. | |
| 6,514,081 B1 | 2/2003 | Mengoli | |
| 6,520,864 B1 | 2/2003 | Wilk | |
| 6,539,336 B1 | 3/2003 | Vock et al. | |
| 6,567,116 B1 | 5/2003 | Aman et al. | |
| 6,569,336 B1 | 5/2003 | Mouchet et al. | |
| 6,669,571 B1 | 12/2003 | Cameron et al. | |
| 6,671,390 B1 | 12/2003 | Barbour et al. | |
| 6,697,103 B1 * | 2/2004 | Fernandez | G08B 13/19608 348/143 |
| 6,707,487 B1 | 3/2004 | Aman et al. | |
| 6,774,345 B1 | 8/2004 | Kenk | |
| 6,774,349 B2 | 8/2004 | Vock et al. | |
| 6,778,866 B1 | 8/2004 | Bettwy | |
| 6,781,621 B1 | 8/2004 | Gobush et al. | |
| 6,816,185 B2 | 11/2004 | Harmath | |
| 6,839,771 B1 | 1/2005 | Bouchier et al. | |
| 7,094,164 B2 | 8/2006 | Marty et al. | |
| 7,101,287 B1 | 9/2006 | Wagner | |
| 7,214,138 B1 | 5/2007 | Stivers et al. | |
| 7,264,554 B2 | 9/2007 | Bentley | |
| 7,658,676 B2 | 2/2010 | Ohta | |
| 7,811,182 B2 * | 10/2010 | Ligotti et al. | 473/407 |
| 7,850,552 B2 | 12/2010 | Marty et al. | |
| 7,854,669 B2 | 12/2010 | Marty et al. | |
| 7,857,708 B2 * | 12/2010 | Ueda et al. | 473/257 |
| 7,899,307 B1 | 3/2011 | Hughes | |
| 8,016,688 B2 | 9/2011 | Gobush | |
| 8,083,617 B2 | 12/2011 | Greenquist et al. | |
| 8,085,308 B2 * | 12/2011 | Icho et al. | 348/208.99 |
| 8,617,008 B2 | 12/2013 | Marty et al. | |
| 8,622,832 B2 | 1/2014 | Marty et al. | |
| 8,644,552 B2 * | 2/2014 | Han et al. | 382/103 |
| 8,723,789 B1 * | 5/2014 | Rafii | 345/156 |
| 2001/0023209 A1 | 9/2001 | Yamamoto | |
| 2002/0098898 A1 | 7/2002 | Manwaring | |
| 2002/0119841 A1 | 8/2002 | Foley | |
| 2002/0131643 A1 * | 9/2002 | Fels | G06K 9/00 382/224 |
| 2002/0155896 A1 | 10/2002 | Gobush et al. | |
| 2002/0173367 A1 | 11/2002 | Gobush et al. | |
| 2003/0054905 A1 | 3/2003 | King, Jr. | |
| 2003/0073518 A1 | 4/2003 | Marty et al. | |
| 2003/0095186 A1 * | 5/2003 | Aman et al. | 348/162 |
| 2003/0109322 A1 | 6/2003 | Funk et al. | |
| 2003/0207718 A1 | 11/2003 | Perlmutter | |
| 2004/0155962 A1 | 8/2004 | Marks | |
| 2004/0240706 A1 * | 12/2004 | Wallace et al. | 382/103 |
| 2005/0012023 A1 | 1/2005 | Vock et al. | |
| 2005/0064948 A1 * | 3/2005 | Bissonnette | 473/199 |
| 2005/0153785 A1 * | 7/2005 | Sun | 473/151 |
| 2005/0215338 A1 | 9/2005 | Miyamoto | |
| 2005/0223799 A1 | 10/2005 | Murphy | |
| 2005/0233815 A1 | 10/2005 | McCreary et al. | |
| 2006/0008116 A1 * | 1/2006 | Kiraly et al. | 382/103 |
| 2006/0100016 A1 | 5/2006 | Hamano et al. | |
| 2006/0105857 A1 | 5/2006 | Stark | |
| 2006/0135297 A1 | 6/2006 | Cruciani | |
| 2006/0189386 A1 | 8/2006 | Rosenberg | |
| 2007/0026974 A1 | 2/2007 | Marty et al. | |
| 2007/0026975 A1 | 2/2007 | Marty et al. | |
| 2007/0129180 A1 | 6/2007 | Levy | |
| 2007/0167247 A1 | 7/2007 | Lindsay | |
| 2007/0167266 A1 | 7/2007 | DeVall | |
| 2007/0275787 A1 | 11/2007 | Bouchard et al. | |
| 2008/0015061 A1 | 1/2008 | Klein | |
| 2008/0268943 A1 | 10/2008 | Jacob | |
| 2010/0259539 A1 * | 10/2010 | Papanikolopoulos et al. | 345/420 |
| 2010/0267443 A1 | 10/2010 | Shimamura et al. | |
| 2011/0028247 A1 * | 2/2011 | Ligotti et al. | 473/407 |

(56) References Cited

U.S. PATENT DOCUMENTS

| | | | |
|---|---|---|---|
| 2011/0085704 A1* | 4/2011 | Han et al. | 382/103 |
| 2011/0273562 A1* | 11/2011 | Dawe et al. | 348/139 |
| 2011/0299729 A1* | 12/2011 | Dawe et al. | 382/103 |
| 2012/0142416 A1 | 6/2012 | Joutras | |
| 2012/0172126 A1 | 7/2012 | Padovani et al. | |
| 2012/0214594 A1 | 8/2012 | Kirovski et al. | |
| 2012/0225719 A1 | 9/2012 | Nowozin et al. | |
| 2012/0258804 A1 | 10/2012 | Ahmed | |
| 2013/0095959 A1 | 4/2013 | Marty et al. | |
| 2013/0095960 A9 | 4/2013 | Marty et al. | |
| 2013/0095961 A1 | 4/2013 | Marty et al. | |
| 2013/0130845 A1 | 5/2013 | Marty et al. | |
| 2013/0172058 A1 | 7/2013 | Marty et al. | |
| 2013/0335528 A1* | 12/2013 | Vishwanath et al. | 348/46 |
| 2014/0092253 A1* | 4/2014 | Marty et al. | 348/157 |
| 2014/0098379 A1* | 4/2014 | Smits | 356/614 |
| 2014/0156042 A1 | 6/2014 | Marty et al. | |

FOREIGN PATENT DOCUMENTS

| | | |
|---|---|---|
| WO | 9729814 A1 | 8/1997 |
| WO | 98/24242 A1 | 6/1998 |
| WO | 01/38898 A1 | 5/2001 |
| WO | 01/54781 A2 | 8/2001 |

OTHER PUBLICATIONS

Complaint filed in *Pillar Vision, Inc.* v. *Infomation Sports Technologies, Inc.*, Case 2:14-cv-00043-RDP, filed Jan. 8, 2014.
"U.S. Appl. No. 12/966,301, Examiner Interview Summary mailed Jul. 30, 2013".
"U.S. Appl. No. 12/966,301, Final Office Action mailed Jun. 19, 2013".
"U.S. Appl. No. 12/966,301, Notice of Allowance mailed Sep. 4, 2013".
"U.S. Appl. No. 13/693,918, Examiner Interview Summary mailed Nov. 6, 2013".
"U.S. Appl. No. 13/693,918, Non Final Office Action mailed Sep. 23, 2013".
"U.S. Appl. No. 13/693,918, Notice of Allowance mailed Nov. 25, 2013".
"U.S. Appl. No. 13/693,918, Restriction Requirement mailed May 17, 2013".
"Hawk-Eye", Retrieved from Internet <http://en.wikipedia.org/wiki/HawkEye> on Jan. 10, 2008.
"U.S. Appl. No. 11/507,886, Non Final Office Action mailed Jun. 10, 2010".
"U.S. Appl. No. 12/015,445, Non Final Office Action mailed Jan. 26, 2012".
"U.S. Appl. No. 10/242,373, Notice of Allowance mailed Apr. 5, 2006".
"U.S. Appl. No. 11/508,004, Non Final Office Action mailed Aug. 4, 2010".
"U.S. Appl. No. 11/972,553, Final Office Action mailed Dec. 13, 2012".
"U.S. Appl. No. 11/972,553, Non Final Office Action mailed Oct. 3, 2011".
"U.S. Appl. No. 12/015,445, Non Final Office Action mailed Jan. 4, 2013".
"U.S. Appl. No. 12/127,744, Final Offce Action mailed Mar. 21, 2012".
"U.S. Appl. No. 12/127,744, Non Final Office Action mailed Jan. 11, 2012".
Brancazio, Peter J., "Physics of basketball", Am.J. Phys. vol. 49. No. 4, Apr. 1981, Department of Physics, Brooklyn College, City University of New York, Apr. 1981, 356-365.
Okubo, H et al., "Dynamics of basketball-rim interactions", Sports Engineering 7, 2004, 15-29.
Okubo, H et al., "Dynamics of basketball-rim interactions", Engineering of Sports 4, Oxford: Blackwell Science, 2002, 660-666.
Okubo, H et al., "Dynamics of the basketball shot with application to the free throw", Journal of Sports Sciences; 24 (12), Dec. 2006, 1303-1314.
Okubo, H et al., "Effects of basketball free throw release conditions using dynamic model", Legacy Venture, 372-378.
Okubo, H et al., "Strategies for Bank Shots and Direct Shots in Basketball", Engineering of Sports 6, vol. 3, Springer New York, 2006, 243-248.
Silverberg, Larry et al., "Numerical Analysis of the Basketball Shot", ASME Journal of Dynamic Systems, Measurement and Control, vol. 125, Dec. 2003, 531-540.
Tran, Chau M. et al., "Optimal release conditions for the free throw in men's basketball", Journal of Sports Sciences, vol. 26, 2008, 1147-1155.
"U.S. Appl. No. 13/693,918, Corrected Petition for Inter Partes Review, served May 16, 2014", 65 pages.
"U.S. Appl. No. 14/176,406, Examiner Interview Summary mailed Jul. 2, 2014".
"U.S. Appl. No. 14/176,406, Non Final Office Action mailed Jun. 11, 2014".
"U.S. Appl. No. 14/176,406, Non Final Office Action mailed Sep. 4, 2014".

* cited by examiner

US 9,283,432 B2

TRAJECTORY DETECTION AND FEEDBACK SYSTEM

CROSS-REFERENCE TO RELATED APPLICATIONS

This application claims priority under 35 U.S.C. §120 and is a Continuation of co-pending U.S. patent application Ser. No. 13/693,912, filed Dec. 4, 2012, which claims priority under 35 U.S.C. §120 and is a Continuation of Ser. No. 12/015,445, filed Jan. 16, 2008, now U.S. Pat. No. 8,409,024, which claims priority under 35 U.S.C. §119(e) to U.S. Provisional Patent Application No. 60/880,773, filed on Jan. 16, 2007. U.S. patent application Ser. No. 12/015,445 further claims priority under 35 U.S.C. §120 and is a Continuation-in-Part application of U.S. patent application Ser. No. 11/508,004, filed Aug. 21, 2006, now U.S. Pat. No. 7,854,669, which is a Continuation-in-Part and claims priority under 35 U.S.C. §120 to U.S. patent application Ser. No. 10/242,373, filed Sep. 11, 2002, now U.S. Pat. No. 7,094,164. U.S. patent application Ser. No. 10/242,373 claims priority under 35 U.S.C. §119(e) from the following three U.S. Provisional Patent Applications 60/323,029, filed Sep. 12, 2001; 60/348,057, filed Jan. 11, 2002; and 60/395,875 filed Jul. 12, 2002. Each of the above provisional and non-provisional applications are incorporated herein by reference in their entirety.

BACKGROUND OF THE INVENTION

The invention relates to apparatus and methods for sports training. In particular, a trajectory detection, analysis and feedback system is provided for analyzing the trajectory of an object launched by a human and providing feedback information regarding the trajectory to the human.

There are many different games of skill played by human for recreational and competitive purposes. In many of these games of skill, such as basketball, soccer, golf, football, baseball, softball, tennis, volleyball, racket ball, water-polo, lacrosse, bowling, shot-put, bowling and javelin, an object is thrown, kicked or struck to launch the object along a trajectory. Often a player's success at the game is contingent upon their skill and consistency at controlling the trajectory of the object used in the game. For instance, a basketball player's success is contingent upon the ability to consistently shoot a basketball into a hoop under a variety of conditions. Thus, a basketball is launched along trajectory by the player with the objective of the trajectory terminating within an area defined by the hoop.

Whether the game is played recreationally or professionally, players generally desire to improve their skills to increase their success at the game. There are many approaches that the player may take to improve their performance. These approaches include reading books, watching videotapes, receiving lessons/coaching, practicing and utilizing training devices.

Many different types of training devices have been developed for different types of sports that are geared toward improving a player's skill. One drawback of these devices is that typically they are applied in a manner that departs from the actual play of the sport. The departure from normal playing conditions can limit the effectiveness of the device. For instance, training devices can be used that are attached to a player to help them develop a prescribed trajectory control skill. However, these training devices are not used in the actual play of the game and can be a distraction to the player employing the device. Thus, the player may find any training benefits from using the device are outweighed by the intrusiveness of the device.

As another example, the training devices can require that objects or equipment not normally used in the play of the game be used, such as special club that is used to improve a player's golf swing or a tee for holding a baseball that is used to improve a baseball swing. Thus, the player may get proficient at using the special equipment and yet not perform well when they are required to use actual equipment in actual playing conditions. As another example, training devices have been developed that must be used in an environment, such as a special room, that is significantly different from the environment where the game is played. Training under these simulated conditions may not translate to performance improvement in actual playing conditions. Further, the devices used in a special environment, are usually difficult to set-up and require another person, besides the player, to operate the device.

Another drawback of current training devices is that the player is not provided any feedback that they can use to evaluate their performance or the feedback can be quite detached from the training experience. When a player receives a lesson or coaching, another person watches their performance and can provide immediate feedback that is valuable to the player. With current training devices, the player uses the device and then later can attempt to judge their performance based upon whether they perceive an improvement in their actual play of the game. However, when the player is using the device improperly or training in a less than optimal manner, the devices do not provide any objective feedback that the player can use to evaluate their performance.

In view of the above, it is desirable to provide training devices and methods that allow the player to improve their trajectory skills for games requiring such skills where the training devices are 1) non-intrusive, 2) operable in an environment that approximates actual playing conditions, 3) simple to set-up and to operate and 4) provide immediate and objective feedback to the user of the device.

SUMMARY OF THE INVENTION

This invention addresses the needs indicated above by providing a trajectory detection and feedback system. The system is capable of detecting one or more moving objects in free flight, analyzing a trajectory of each object and providing immediate feedback information to a human that has launched the object into flight. The feedback information may include one or more trajectory parameters that the human may use to evaluate their skill at sending the object along a desired trajectory. In a particular embodiment, a non-intrusive machine vision system that detects trajectories of moving objects may be used to evaluate trajectory parameters for a basketball shot at a basketball hoop by a player. The feedback information, such as a trajectory entry angle into the basketball hoop and/or an entry velocity into the hoop for the shot, may be output to the player in an auditory format using a sound projection device. The system may be operable to be set-up and to operate in a substantially autonomous manner. After the system has evaluated a plurality of shots by the player, the system may provide 1) a diagnosis of their shot consistency, 2) a prediction for improvement based upon improving their shot consistency and 3) a prescription of actions for improving their performance.

One aspect of the present invention is a device for providing trajectory detection and feedback. The device may be generally characterized as comprising: 1) one or more sensors for detecting physical information used to characterize a trajectory of an object launched along its trajectory by a human; 2) a logic device designed or configured to i) generate trajectory parameters that characterize one or more states of the object along it's trajectory from the physical information and ii) generate feedback information using the trajectory parameters; and 3) one or more feedback output mechanisms for providing the feedback information to the human. The device may be designed to detect information in a non-intrusive manner such that the one or more sensors is not located on the object, on the human or on a device attached to the human or the sensors are not noticed by the human. For ease of use, the device may be capable to be set-up and/or to operate in an autonomous manner. The feedback information may be used by the human to improve their skill at launching the object along a desired trajectory.

In particular embodiments, the physical information may be provided via one of an energy signal reflected from the object or an energy signal emitted from a signal source located on the object. The device may include a signal source for emitting energy signals that are detected by the one or more sensors. The energy signals may be electromagnetic energy signals or an acoustic energy signals. For a sensor system including the one or more sensor that is set-up in a particular location, an object that is launched into its trajectory by the human at one of a plurality of locations on a playing surface may be detected and may be analyzed by the system. In one embodiment, the sensor system may be able to detect trajectories for a basketball shot from a number different locations on a basketball court.

The one or more sensors may be a camera or charge coupling device. The camera and/or charge coupling device may be part of a machine vision system. Thus, the physical information may be video frame data recorded by a video camera. The camera may also be used to record physical information about the human. The physical information about the human may be analyzed by the system to provide additional feedback information.

Prior to its launch, the object may be grasped by the human and forces used to launch the object along its trajectory may be applied via one or both hands. Also, to launch the object along its trajectory, the object may be hit with a hand-held device grasped by the human. The object may be launched by the human as part of game of skill where the objective of the game of skill is to launch the object along a trajectory that terminates within a selected area. In one embodiment, the game of skill is basketball and the selected area is a basketball hoop. A playing area where the trajectory is generated may be the playing area where the game of skill is normally played, such as a basketball court. The one or more sensors may be remote sensors located outside of the playing area or may be non-intrusive sensors located within the playing area that do not affect the play of the game of skill in the playing area.

In other embodiments, the logic device may be further designed or configured to generate a curve fit from the physical information that approximates the object's trajectory and the trajectory parameters. In particular, the curve fit may be a parabolic arc. The curve-fit may be used to generate trajectory parameters corresponding to different states along the object's trajectory such as an initial state of the trajectory, a final state of the trajectory or any of the states of the trajectory between the initial state and the final state. However, in some embodiments, the trajectory parameters may be generated without the use of a curve-fit. Some examples of the trajectory parameters may include but are not limited to a speed, a directional velocity component, a position, a rotation rate, one or more axis's of rotation, one or more directional angles and a directional acceleration component.

After the trajectory of the object has been detected and characterized, feedback information may be generated and may be provided to the human. The feedback information may be used for performance evaluation or by the human to improve their skill at launching the object along a trajectory that terminates within a selected area. The feedback information may be one of 1) one of the trajectory parameters, 2) a plurality of the trajectory parameter and 3) a feedback parameter generated from a combination of trajectory parameters. The feedback information may be provided to the human in at least one of a visual format, an auditory format, a kinetic format and combinations thereof. In some instances, the feedback information may be provided in an alpha-numeric format which is transmitted to the player via a visual display or through a sound projection device. In various embodiments, the feedback information may be qualitative or quantitative in nature.

The feedback information may be provided to the human prior to the object reaching the end of its trajectory. For example, the object may be a basketball and the feedback information may be one of an entry angle that the basketball enters a basketball hoop and a speed that the basketball enters the basketball hoop. This feedback information may be provided to the player before the basketball reaches the basketball hoop or within a short period of time after the basketball passes through the hoop.

In particular embodiments, the device may be capable of generating trajectory parameters and providing feedback information for each of a plurality of different trajectories in a trajectory session. The device may further comprise a memory storage device for storing trajectory session information wherein the trajectory session information comprises one or more of 1) physical information, trajectory information and feedback information generated for the plurality of trajectories, 2) a trajectory session time, 3) a trajectory session date, 4) a trajectory session location and combinations thereof. The device may also comprise a database for relating the trajectory session information to human identification information.

In a trajectory session, the plurality of trajectories that are detected and analyzed may be generated by a plurality of different players. During the trajectory session, two or more objects may be in flight at a same time. The device may be capable of detecting, analyzing and providing feedback information for the trajectories of two or more objects in flight at the same time. The two or more trajectories that are in flight at the same time may be generated by the same player or may be generated by two or more different players.

In a particular embodiment, the device may include session analysis software for one or more of 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters and 5) prescribing actions for improving performance.

Another aspect of the present invention provides a device for analyzing a trajectory of a basketball, the device comprising: 1) one or more cameras for recording video frame data used to characterize a trajectory of a basketball shot by a human; 2) a logic device designed or configured to i) to receive the video frame data, ii) generate trajectory parameters that characterize one or more states of the basketball along it's trajectory and iii) generate feedback information using the trajectory parameters; and 3) one or more feedback output mechanisms for providing the feedback information to the human. The feedback information may be used by the human to improve their skill at shooting the basketball. A playing area where the basketball is shot may be one where a basketball game is normally played, such as a gymnasium, arena or outdoor basketball court. For ease of use, the device may be capable of autonomous set-up or autonomous operation.

In a particular embodiment, the one or more cameras, the logic device and the one or more feedback output mechanisms may be enclosed in a housing. The housing may be water-proofed for outdoor use. One or more wheels may be attached to the housing to allow it to be easily moved and positioned. At least one input mechanism, such as touch screen display, may be mounted to the housing for configuring and operating the device. The touch screen display may be used to view one or more of configuration information, operational information and session information. The feedback output mechanism may be a sound projection device that can be enclosed within the housing.

The device may include an internal power supply for supplying power to the device, such as a re-chargeable battery or a fuel cell. The power supply may be enclosed in the housing. For outdoor models, photocells may be used for supplying power to the device and charging the battery. The device may also include a power interface for connecting the device to an external power source. The external power source may be used to directly power the device or to charge a battery within the device.

In other embodiments, a video capture card for digitizing video frame data recorded by the one or more cameras. Using the video frame data, the logic device may be designed to generate a curve-fit of the trajectory of the basketball. Further, the video frame data may include physical information about the human, which may also be processed and analyzed by the logic device. The logic device may be a general purpose computer comprising: a processor, a data storage device, RAM, operating system software, device interfaces, device drivers and trajectory analysis software. A mass storage device may be used for storing the recorded video frame data. Further, video editing software may be used for editing the recorded video frame data stored on the mass storage device.

The trajectory analysis device may include a number of communication interfaces for communicating with components of the system and peripheral devices connected to the system. As an example, the system may include a wireless network interface or a wire network interface for connecting the logic device to one of a local area network, a wide area network and the Internet. When connected one of these networks, the system may communicate with various devices also connected to the network. A wireless interface may be used for providing communications between the one or more cameras and the logic device or for providing communications between the logic device and one or more peripheral devices. Examples of peripheral devices that may communicate with the logic device include hand-held computing devices, displays, wearable sound projection devices, kinetic feedback devices and printers.

In a particular embodiment, two or more cameras may be used for recording video frame data. The two or more cameras may be mounted to a basketball hoop backboard Infrared light emitters may also be mounted to the backboard. The emitters may be used to illuminate the basketball in infrared light as it approaches the backboard. Thus, the two or more cameras may be capable of detecting infrared light reflected from the basketball.

The components of the system may be enclosed in two or more housings and communication interfaces may be used for communications between the components. For instance, a housing may enclose the cameras, light emitters and a communication interface while the logic device and feedback output mechanism may be located in a separate housing. Thus, the communication interface may be used for transmitting one of a) video frame data, b) trajectory parameters, c) feedback information and combinations thereof to the logic device. The housing with the two or more cameras and infrared emitters may be mounted to a backboard. The backboard may be used outside. Therefore, the housing may be water-proofed for outdoor use.

The feedback information supplied users of the device may be 1) one of the trajectory parameters, 2) a plurality of the trajectory parameters or 3) a feedback parameter generated from a combination of trajectory parameters. The trajectory parameters may characterize different states of the trajectory such as an initial state of the trajectory, a final state of the trajectory or states of the trajectory between the initial state and the final state. The trajectory parameters used in the feedback information may be selected based upon their benefit to the human in improving their shooting skills. A few examples of trajectory parameters that may be generated for different states along the trajectory include a release height, a release angle, a release velocity, an entry angle into a basketball hoop, an entry velocity into the basketball hoop, an entry position of a center of the basketball relative to a center of the basketball hoop, a transverse velocity of the basketball relative to a normal line drawn through the center of the basketball hoop, a missed shot, a made shot, a rotation rate of the basketball and axis of rotation of the basketball.

The feedback information may be provided to the human in at least one of a visual format, an auditory format, a kinetic format and combinations thereof. For instance, the feedback information may be a trajectory parameter, such as release velocity, that is presented in a numeric format. The numeric format may be viewed by the human on a video display or heard by the human from an audio device. In a particular embodiment, the feedback information may be used as input parameters for a video game.

The device may be capable of generating trajectory parameters and providing feedback information for each of a plurality of different trajectories in a trajectory session. The plurality of different trajectories may be shot from a plurality of different locations on a basketball court or approximately the same location, such as a free-throw line. The device may include or may be in communication with a memory storage device that is used for storing trajectory session information. The trajectory session information may comprise one or more of 1) digitized video frame data, trajectory information and feedback information generated for the plurality of trajectories, 2) a trajectory session time, 3) a trajectory session date, 4) a trajectory session location and combinations thereof. The device may include a database for relating the trajectory session information to human identification information.

In a trajectory session, the plurality of basketball trajectories that are detected and analyzed may be generated by a plurality of different players. During the trajectory session, two or more basketballs may be in flight at a same time. The device may be capable of detecting, analyzing and providing feedback information for the trajectories of two or more basketballs in flight at the same time. The two or more shots that are in flight at the same time may be generated by the same player or may be generated by two or more different players.

The device may also include session analysis software. The session analysis software may perform one or more of 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters and 5) prescribing actions for improving performance.

Another aspect of the present invention provides a method of providing trajectory detection and analysis for a trajectory of an object launched along its trajectory by a human. The method may be generally characterized as comprising: 1) receiving physical information about the object along its trajectory from one or more sensors; 2) generating trajectory parameters from the physical information; 3) generating feedback information; and 4) providing the feedback information to the human. The feedback information may be provided to the human prior to end of the trajectory of the object or within a short time after the end of the trajectory of the object. The feedback information may be provided in one of a visual format, an auditory format and a kinetic format.

The object may be launched by the human as part of game of skill, such as basketball, where the objective of the game is to launch the object along a trajectory that terminates within a selected area. For instance, shooting a basketball into a basketball hoop. A playing area where the trajectory is generated may be the playing area where the game of skill is normally played, such as a basketball court. The one or more sensors may be remote sensors that are located outside of the playing area or the one or more sensors may be non-intrusive sensors located with the playing area that do not affect the play of the game of skill in the playing area.

In particular embodiment, the method may comprise one or more of the following: a) recording video frame data wherein the one or more sensors is a camera; determining a position of the object in a plurality of the video frames from the video frame data generating a curve-fit of the trajectory of the object from the determined positions; and generating one or more trajectory parameters from the curve-fit, b) prior to generating the curve fit, digitizing the video frame data, c) prior to determining the position of the object, editing out portions of the video frame data, d) receiving physical information from the one or more sensors from two or more objects in flight at the same time; generating trajectory parameters for the two or more objects; and providing separate feedback information for each of the objects and e) generating a list or plot of trajectory parameters for a plurality of trajectories.

In another embodiment, the method may also comprise generating one or more aggregate trajectory parameters from the trajectory parameters from a plurality of different trajectories where the aggregate trajectory parameters characterize the human's consistency. The aggregate trajectory parameters may be a measure of statistical variability of different trajectory parameters. Thus, the method may also comprise predicting performance improvement as a function of the one or more aggregate trajectory parameters and generating a prescription comprising one or more actions for improving performance.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media. Yet another embodiment of the present invention is a system for delivering computer readable instructions, such as transmission, over a signal transmission medium, of signals representative of instructions for remotely administering any of the methods as described above.

These and other features of the present invention will be presented in more detail in the following detailed description of the invention and the associated figures.

DESCRIPTION OF THE PREFERRED EMBODIMENTS

The present invention provides methods and apparatus for trajectory detection and analysis for trajectories of objects launched by a human in games of skill. One objective of the methods and apparatus is to generate feedback information that may be used by a participant in the game of skill to improve their performance at the game. In a particular embodiment of the invention, a trajectory device is used to detect and analyze a trajectory of a basketball shot by a human and provide feedback information about the trajectory to the shooter. However, the present invention is not limited to basketball and may be applied to other games of skill that involve object being launched along a trajectory, such as soccer, golf, football, baseball, softball, tennis, volleyball, racquet ball, bowling, water-polo, lacrosse, shot-put and javelin.

Figure 1:
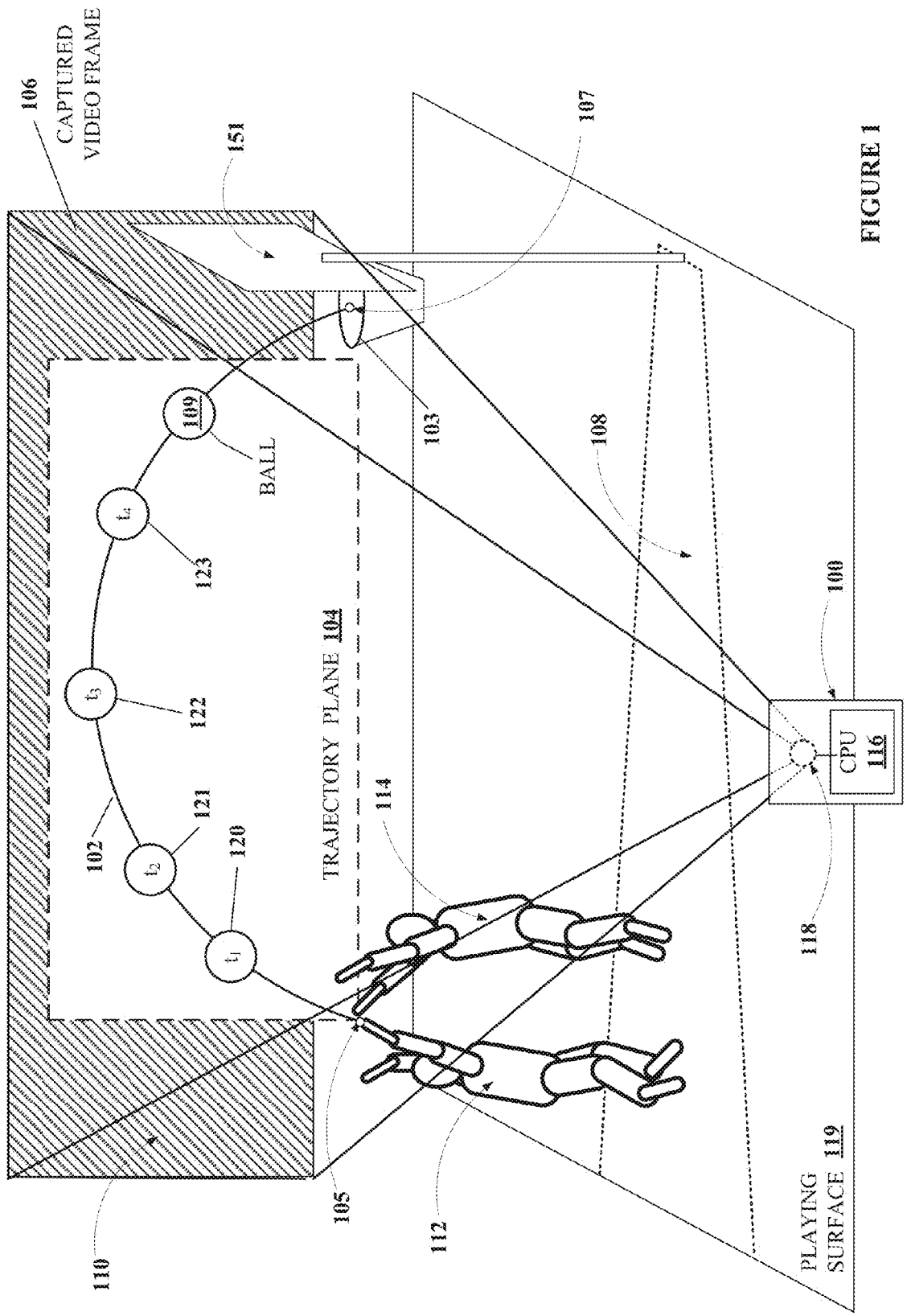
FIG. 1 is a diagram of a trajectory capture and feedback scenario employing a trajectory detection and feedback system of the present invention.
Figure 2:
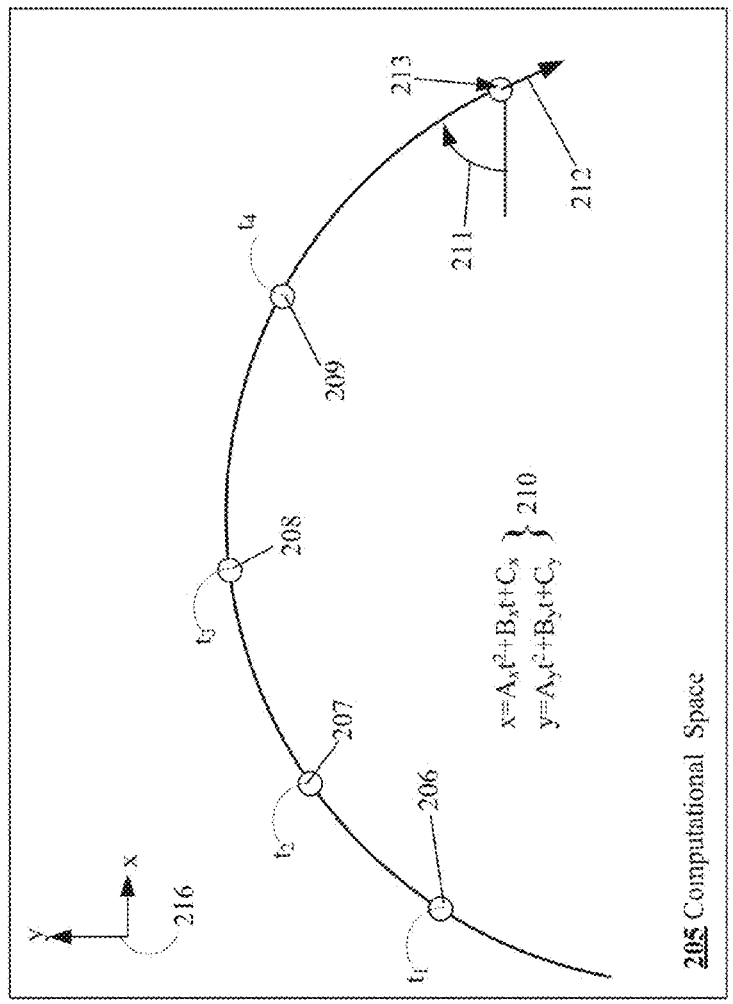
FIG. 2. is a diagram of captured video frame data used to generate a curve-fit for a trajectory of an object.
Figure 3:
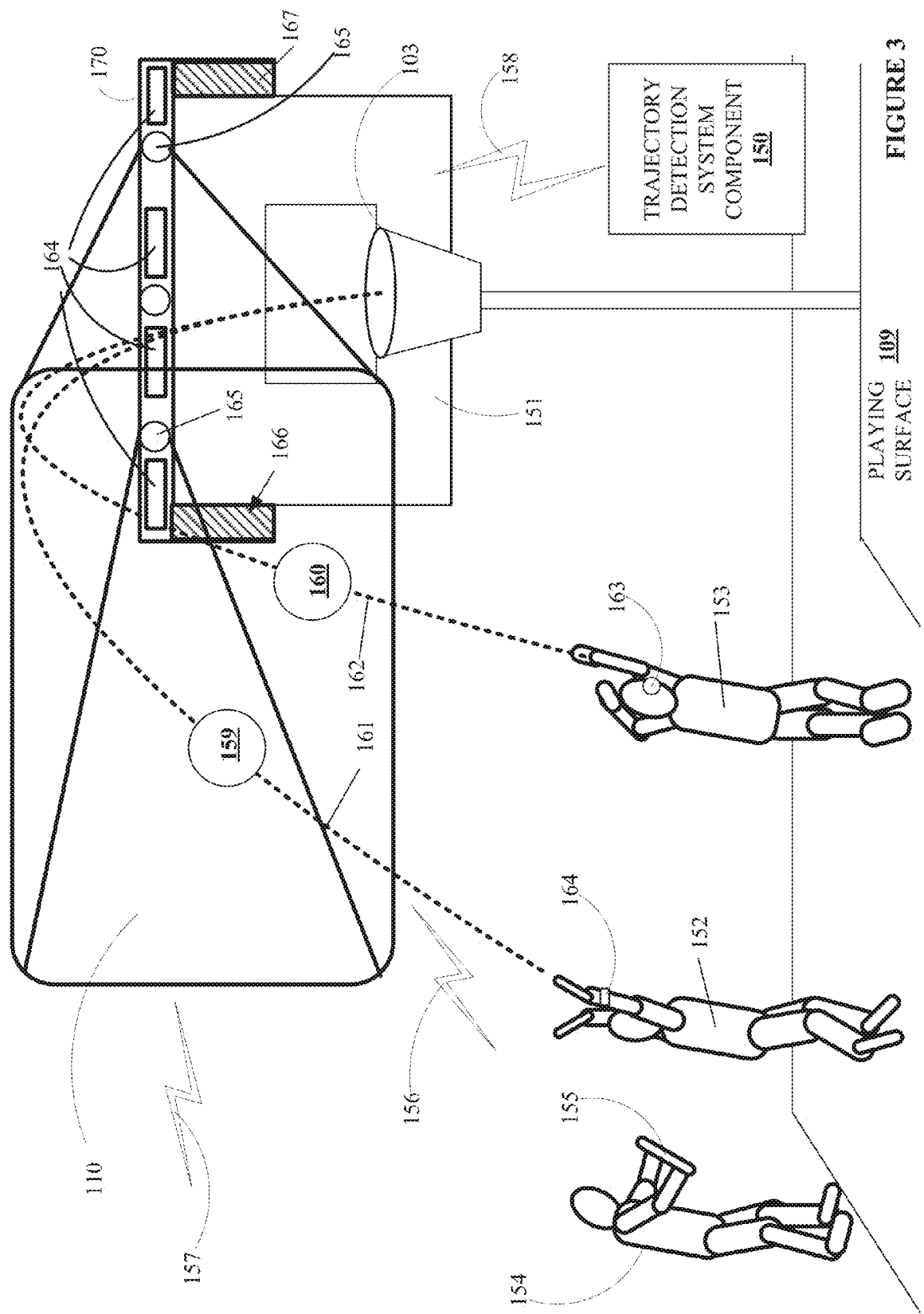
FIG. 3 is a diagram of a second trajectory capture and feedback scenario employing a trajectory detection and analysis device of the present invention.
Figure 4:
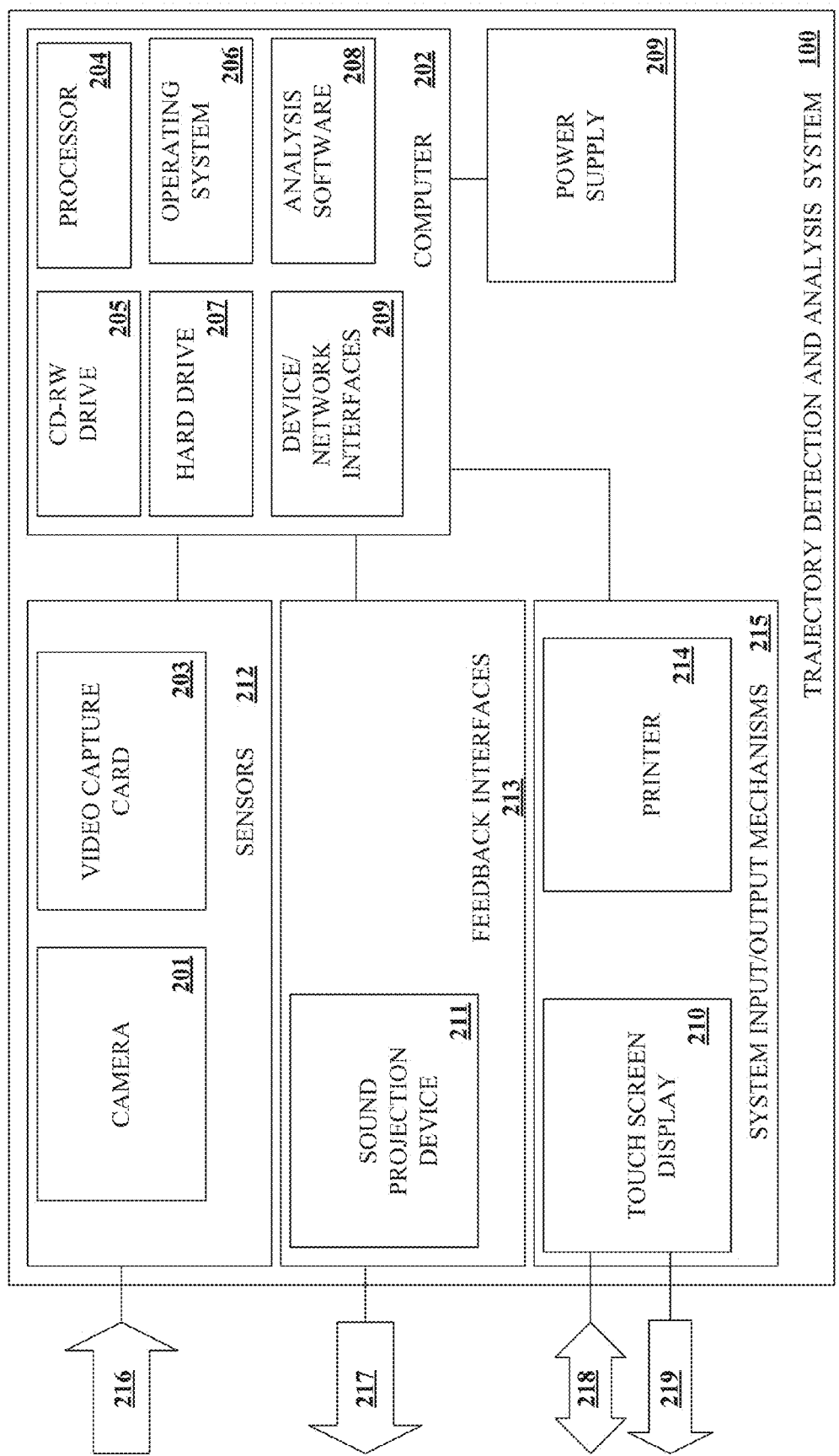
FIG. 4 is a block diagram of a trajectory detection and analysis system of the present invention.
Figure 5:
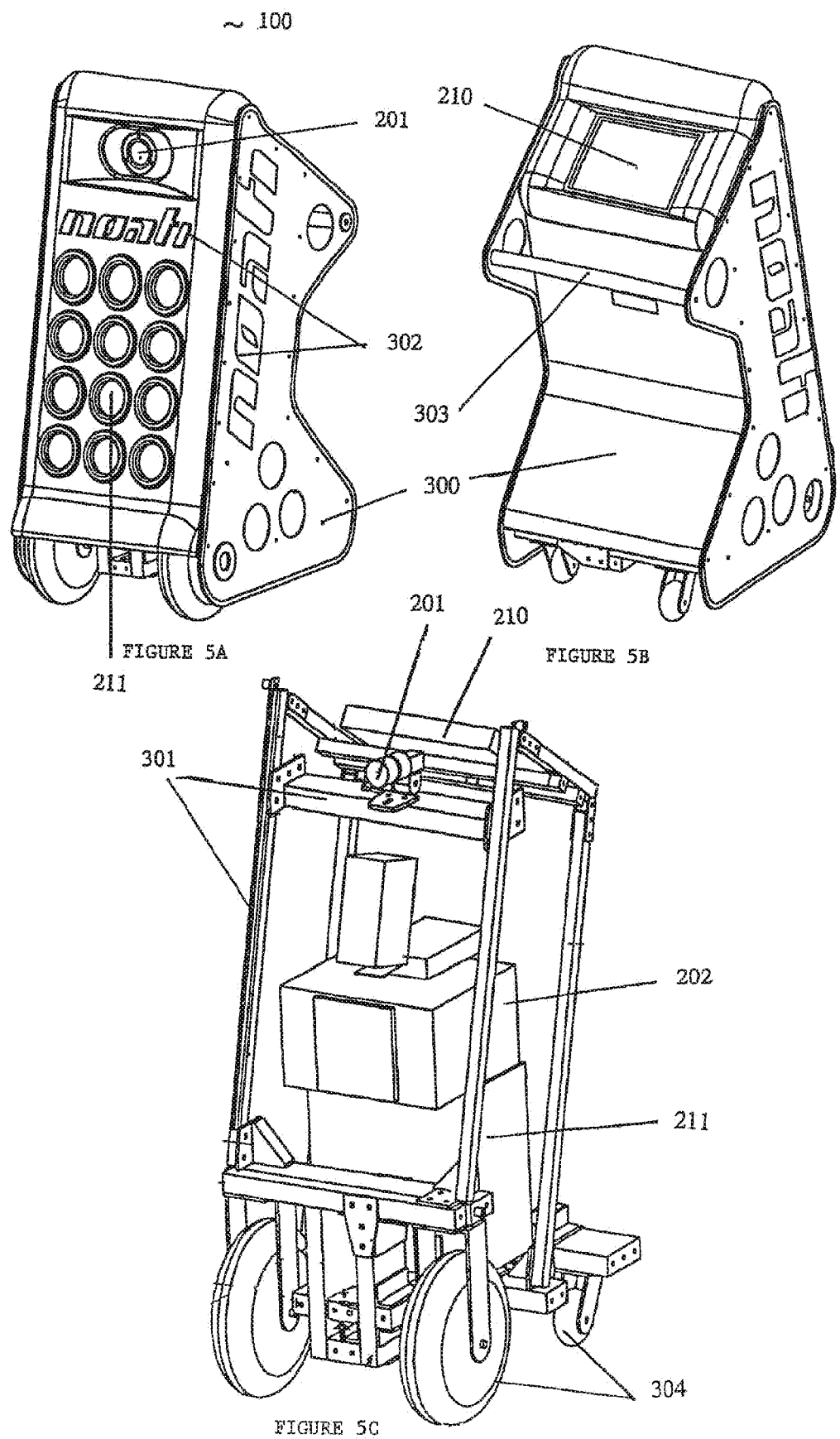
FIGS. 5A-5C are perspective drawings of a trajectory detection and analysis system of the present invention.
Figure 6:
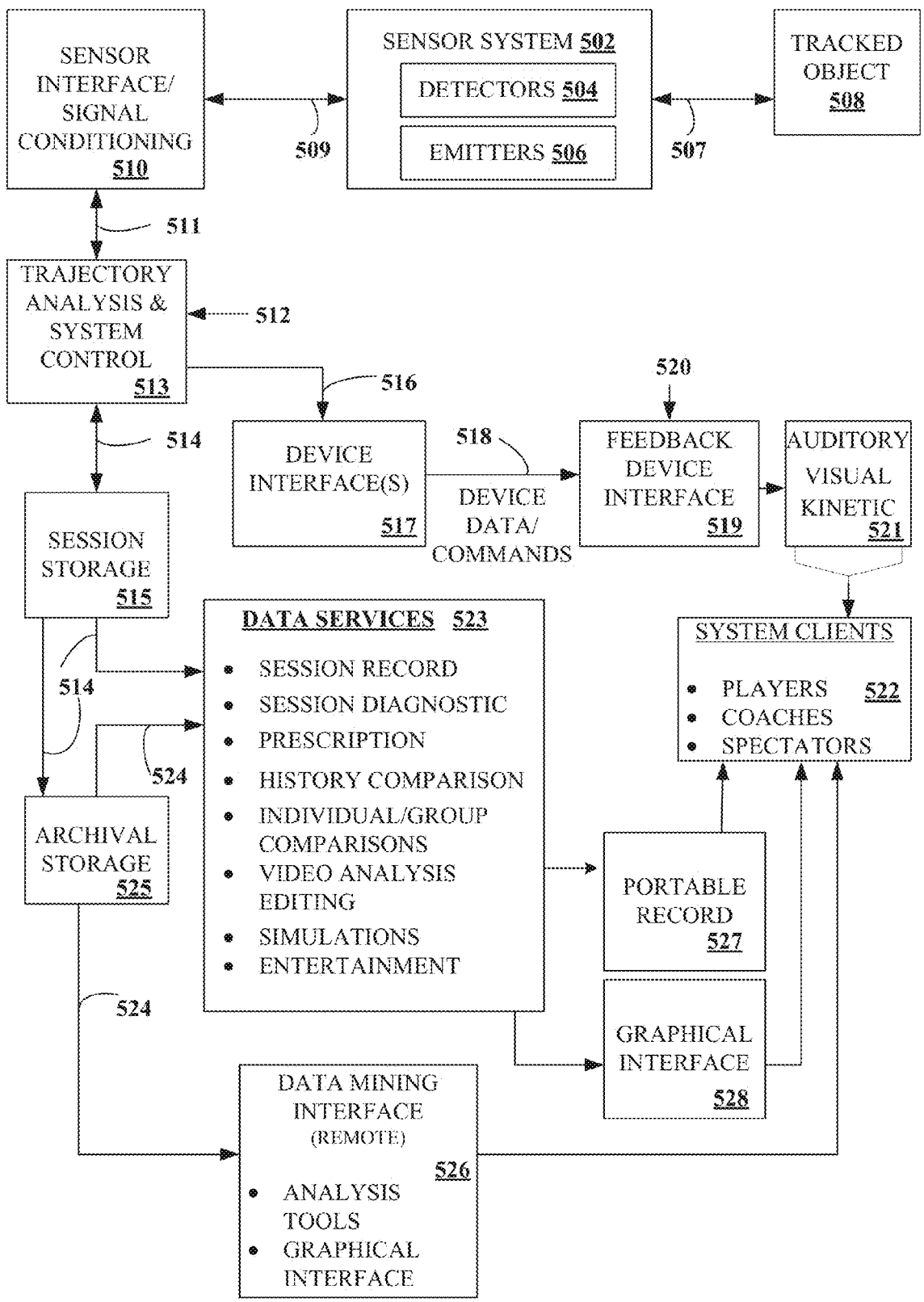
FIG. 6 is an information flow diagram for of a trajectory detection and analysis system of the present invention.
Figure 7:
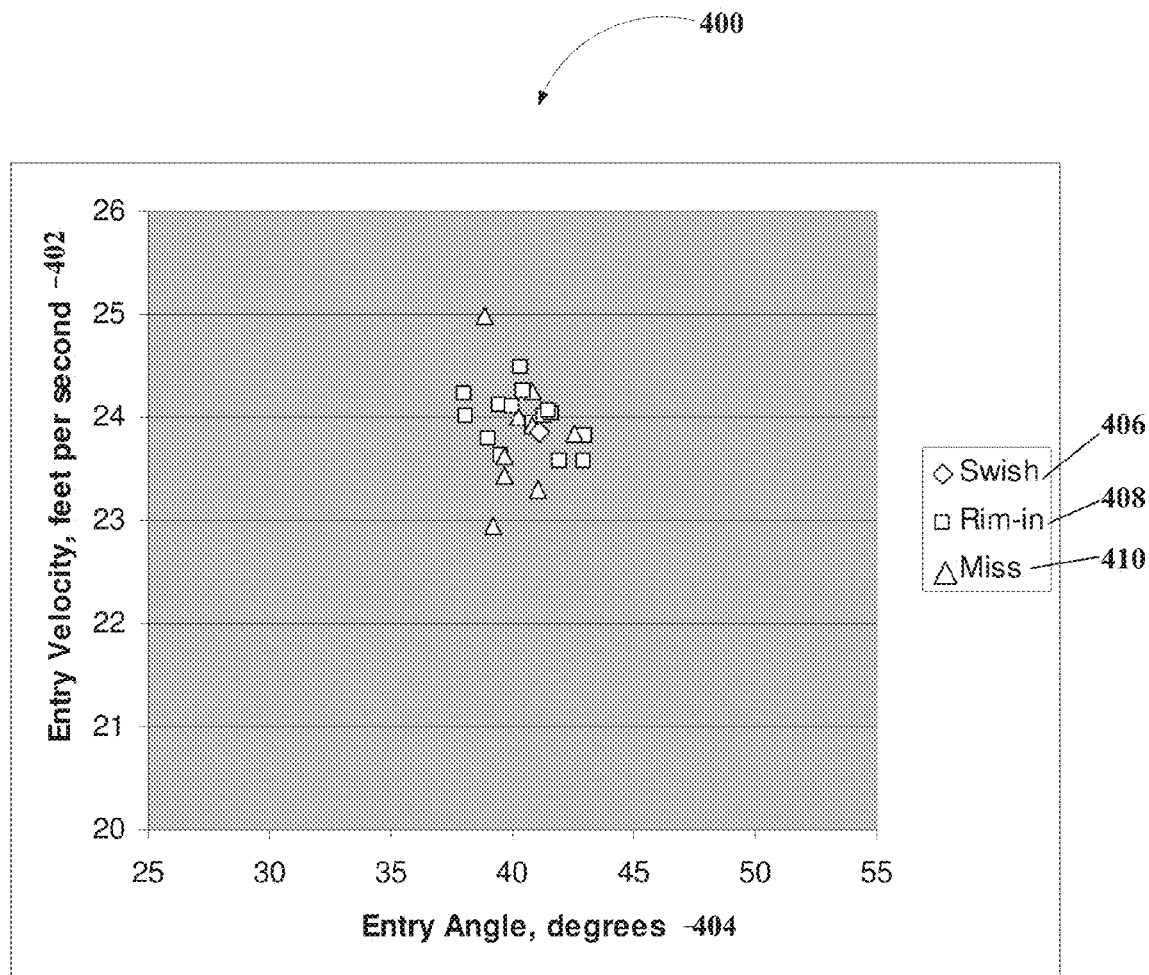
FIG. 7 is a shot scatter plot that may be provided by a trajectory detection and analysis system.
Figure 8:
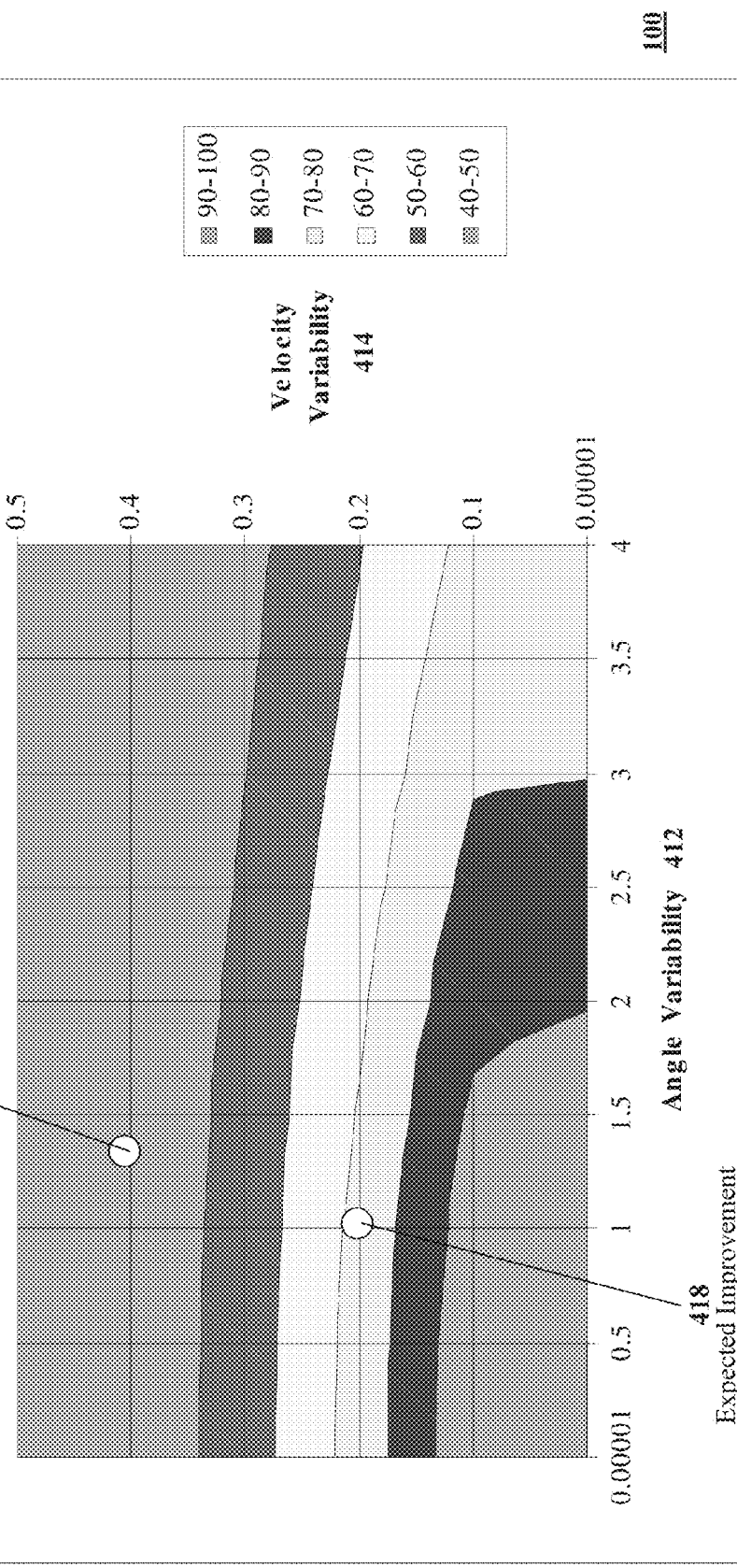
FIG. 8 is an improvement map that may be provided by a trajectory detection and analysis system.
Figure 9A:
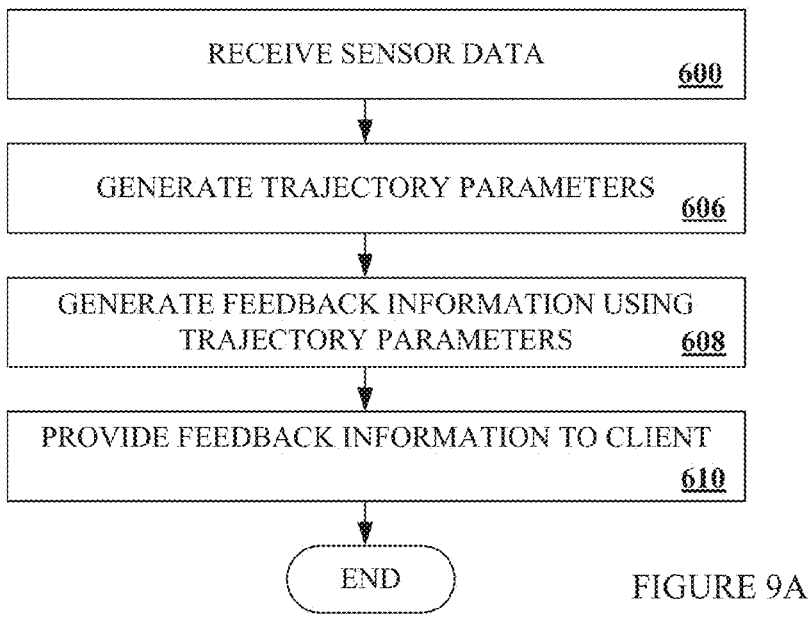
FIGS. 9A and 9B are flow charts of methods for providing trajectory detection and feedback using a trajectory detection and analysis system.
Figure 9B:
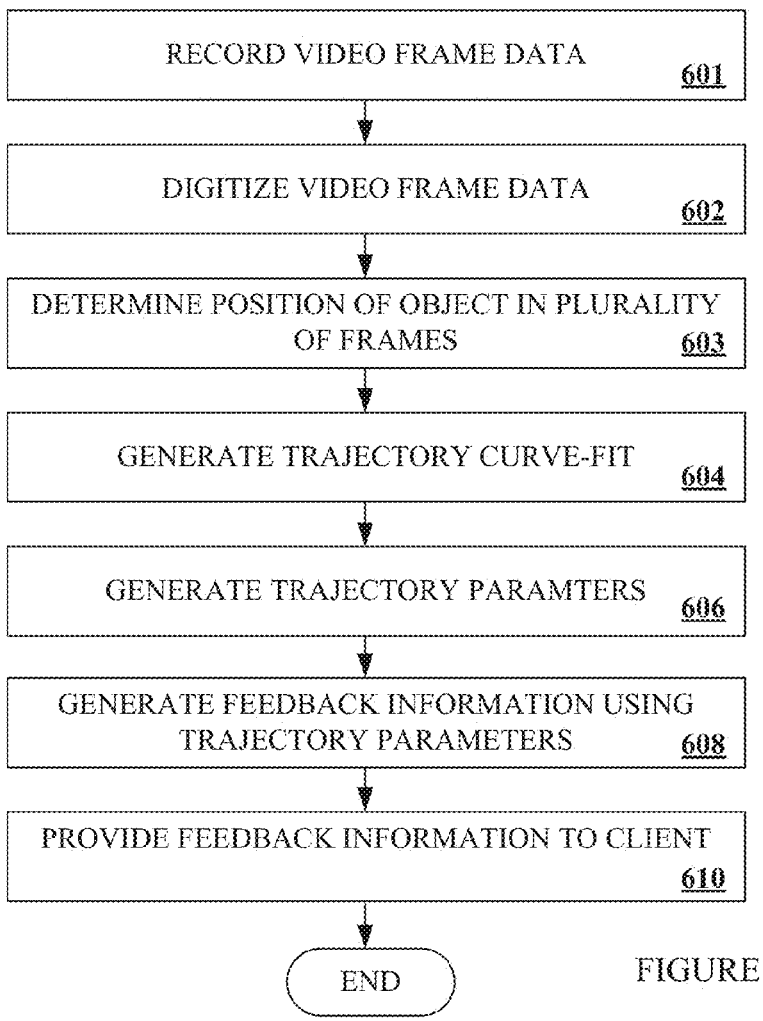

In FIG. 1, a trajectory detection, analysis and feedback system using a machine vision system with a single camera to detect basketball trajectories is described. In FIG. 2, details of determining trajectory parameters from video frame data captured by the machine vision system is described. In FIG. 3, another embodiment of a trajectory detection, analysis and feedback system using a plurality of cameras and infrared emitters to illuminate a tracked object is described. In FIG. 4, a block diagram with internal components of the trajectory detection, analysis and feedback system is discussed. In FIGS. 5A-5C, perspective diagrams of a trajectory device of the present invention are described. In FIG. 6, details regarding an information flow and processing of data in the trajectory system are provided. In FIGS. 7 and 8, two output formats for basketball trajectory data generated from the trajectory system is described. In FIGS. 9A-9B, methods of gathering trajectory data, providing session data and predictions of improvement to a user of the system are described.

FIG. 1 is a diagram of a trajectory capture and feedback scenario employing a trajectory detection and feedback system of the present invention. In the embodiment shown in the figure, a trajectory detection, analysis and feedback system 100 uses a machine vision system with a single camera 118 to detect and to analyze a trajectory 102 of a basketball 109 shot towards the basketball hoop 103 by the shooter 112. The camera 118 may record visible light. A block diagram of the system 100 is described with respect to FIG. 4.

The basketball hoop 103 may be mounted to a backboard 151 with a support system to hold it up, such as a pole anchored into the ground, a support anchored into a wall or supports suspended from a ceiling. The basketball hoop 103 may be of a standard height and the basketball may be a standard men's size basketball. However, trajectories for a basketball of a different size, such as a women's ball, shot at basketball hoop of varying heights may also be detected and analyzed with the present invention.

The camera 118 in the machine vision system records physical information within a detection volume 110. The physical information that is recorded is images of objects at a particular time in the detection volume 110. The images recorded at a particular time may be stored as a video frame 106. The camera 118 may capture images of the basketball 109 as it moves in trajectory plane 104 as well as images of other secondary objects. The secondary objects may be closer to the camera than the basketball 109 (i.e., between the camera 118 and the trajectory plane 104) or the secondary objects may be farther away from the camera than the basketball 109 (i.e., beyond the trajectory plane 104). The machine vision system may utilize software to distinguish between the movement of secondary objects that may be detected and the movement of the basketball 109.

The trajectory detection system 100 may be set-up in a playing area where basketball is normally played, such as a basketball court with playing surface 119 located in gymnasium or arena. The system 100 may be positioned on the side of court and remotely detect the trajectories of the shots by shooter 112 using the machine vision system. Thus, the shooter 112 and defender 114 may engage in any of their normal activities on the playing surface 119 without any interference from the detection system 100. In the figure, the shooter 112 is guarded by a defender 114. However, the system 100 may also be used when the shooter 112 is unguarded.

With a machine vision system that uses a single camera 118, the locations where the trajectory 102 may be accurately analyzed may be limited. In one embodiment, with the set-up of the trajectory detection system 100 on the side of playing surface 119, accurate analysis may require that the shooter 112 shoot from within the active area 108. In this alignment, the trajectory plane 104 may be nearly normal to the basketball backboard 151. Although, the system 100 may accurately detect and analyze trajectories where the angle between the trajectory plane 104 and the normal to the backboard 151 is within a few degrees. The active area 108 may be different for different systems 100. For instance, in FIG. 3, a machine vision system employing three camera's is described where the active area 108 is essentially any location on the playing surface. Further, the present invention is not limited to machine vision systems for detecting the trajectory of the basketball and other sensor systems may allow for different active areas.

The trajectory system 100 may be set-up in different locations around the playing surface 119. By moving the system 100, the active area 108 may be changed. For instance, the trajectory detection may be positioned behind the backboard 151. For this set-up, the active area 108 may be a rectangular area on the playing surface 119 that is parallel to the backboard 151.

Although the active area 108 may be limited with a single camera 118 in a machine vision system, an advantage of the system is it simple to set-up and to operate. With some multiple camera machine vision systems, the active area may be larger than with a single camera system. However, the set-up and calibration of a multi-camera system may be more time consuming as compared to a single camera system because a known alignment of the cameras relatively to one another and relative to the tracked object is needed to process the data.

The single camera system 100 is simple enough to be capable of autonomous set-up and operation with minimal user input. The system may autonomously calibrate itself using known distance markers, such as the height of the basketball hoop or a distance to a free throw line or 3-point arc, which may be captured in video frame data. In another embodiment, a user may be required to stand within the detection zone of the system, holding a basketball or other object, at a fixed distance from the camera and at a fixed height. After the system is calibrated, a user may use the system 100 to practice without the help of an additional operator to run to the system 100. The system 100 may accept voice commands allowing the user to adjust the operation of the system from a distance.

To analyze a trajectory 102 of the basketball 109, the camera 118 may record a sequence of video frames in the detection volume 110 at different times. The number of frames recorded by the camera over a give time period, such as the duration of the ball's trajectory 102, may vary according to the refresh rate of camera 118. The captured video frames may show a sequence of states of the basketball 109 at different times along its trajectory 102. For instance, the camera 118 may capture 1) an initial state 105 of the trajectory shortly after the ball leaves the shooter's hand, 2) a number of states along the trajectory 102, such as 120, 121, 122 and 123 at times t1, t2, t3 and t4 and 3) a termination point 107 in the basketball hoop 103. Although not shown, the system may also be used to generate parameters for characterizing the trajectory of missed shots relating to the rebound flight path, such as but not limited to a rebound height, rebound angle, rebound velocity.

The sequence of captured video frames may be converted to digital data by a video capture card for analysis by the CPU 116. The analysis of video frame data may require the detection volume 110 to remain constant during the trajectory 102. However, the detection volume 110 may be adjusted to account for different set-up conditions of a playing area where the system 100 is employed. For instance, the camera 118 may be capable of zooming in or out of a particular area and changing its focus. The analysis of the trajectory 102 using the captured video frame data is described with respect to FIG. 2.

The series of frames used to capture the trajectory may also capture the shooter 112 shooting the basketball 109 including all or a portion of the shooter's 112 body as well as the defender's body 114 during the shot. The physical information captured by the camera 118 regarding the shooter 112 and the defender 114 may also be analyzed by the system 100. For example, different motions of the shooter 112 may be analyzed by the system 100 determine if the shooter is using proper shooting mechanics. As another example, data, such as, a jump height, hang-time, a release point floor position on the playing surface 109, a landing position on the playing surface 109 may be determined using the video frame data captured by the camera 118 in the machine vision system.

After detecting and analyzing the trajectory 102, the system 100 may generate one or more trajectory parameters. The one or more trajectory parameters may be output as feedback information to the shooter 112 and the defender 114. Typically, the system 100 may provide the feedback information while the shot is in the air or shortly after the shot has reached the hoop 103. The feedback information may be provided within less than a second or less than 10 seconds of the initiation of the shot depending on the type of feedback information that is generated. The immediate feedback may increase the training benefits of using the system. The shooter 112 may use the feedback information to improve their skill at making shots. The defender 114 may use the feedback information to improve their defense in preventing the shooter from making their shots. A brief description of the methods used to develop the feedback information is described as follows.

The shooter 112 may also use the feedback information for rehabilitative purposes. For instance, after an injury and/or for psychologically reasons, a player's skill at shooting may decline from a previously obtained skill level. In rehabilitative setting, the present invention may be used by the player to regain their previous skill level and even improve upon their previous skill level. For instance, the feedback information provided by the present invention may increase a shooter's confidence which may provide psychological benefits that lead to an improvement in performance.

To develop basketball feedback information, the basic nature of a basketball shot is considered with the objectives of 1) informing the player in regards to what are a set of optimal trajectory parameters that they can adjust to increase their probability of making a shot and 2) informing their player about how their shots compare to the optimal. This information is output to the player as feedback information. As an example of this process, the basketball shot by the shooter 112 is described. However, the system 100 may be applied to the trajectories of other objects in different sports where optimal trajectory parameters may be different than basketball. Thus, the description is presented for illustrated purposes only.

The basketball shot by the shooter 112 travels in an essentially parabolic arc in the trajectory plane 104. The arc is essentially parabolic and the ball 109 travels in-plane because after the ball is released the dominant force acting on the ball is gravity 109. Other forces, such as ball spin, or if the ball is shot outside, wind, may cause the trajectory to deviate from a parabolic arc. But, when the ball is shot inside, these forces cause little deviation from the parabolic trajectory and a parabolic arc is a good approximation of the trajectory 102.

For each shot by the shooter with an initial release height, there are many different combinations of release velocity and release angles at the initial state 105 that allow the player to make the shot, i.e., the ball travels through the basket 103 and then many combinations of release velocity and release angles where the player does not make the shot. When a player shoots the basketball 109, the player selects a combination of release velocity and release angle. Typically, the selection of the shot parameters is performed intuitively and the player doesn't consciously think of what release velocity and release angle they are selecting. However, through training, the player may be able to improve their intuitive shot selection.

Within the group of the different combinations of release velocity and release angle that may be selected by the shooter, there are combinations of release velocity and release angle that provide the shooter with a greater or lesser margin of error for making the shot. For instance, for a basketball shot in the basket 103, an optimal entry angle into the hoop that provides the greatest margin of error is about 43-45 degrees measured from a plane including the basketball hoop 103. These optimal trajectories are close to trajectories that allow for the ball to reach to the basket 103 with a minimal amount of energy applied by the shooter. For perturbations around this optimal entry angle, such as when the defender 114 causes the shooter 112 to alter their shot, there are more combinations of release velocity and release angle that allow the shot to be made as compared to other combinations of release velocity and release angle away from the optimal.

With the general understanding of basketball trajectories provided above, methods may be developed for providing feedback information that allows for the shooter 112 to train for an initial state 105 that provides the greatest margin of energy i.e., a near minimum energy trajectory. In one embodiment of the present invention, an entry angle and an entry velocity of the basketball 109 near the termination point 107 are two trajectory parameters that may generated from the physical information recorded by the machine vision system in system 100. The entry angle and entry velocity are correlated to the release angle and the release velocity of the shot 102. Thus, after the shooter 112, releases the shot, the camera 118 may record a series of video frames with images of the ball 109 as it approaches the basket 103. With this information, the entry angle and the entry velocity of the shot may be generated. One or both of these trajectory parameters may be provided to the player as feedback information.

The feedback information may be provided to the shooter 112 and the defender 114 in one of a visual format, an audio format and a kinetic format. For instance, in one embodiment, on a visual display, the entry angle and/or entry velocity may be viewed in a numeric format by the players, 112 and 114. In another embodiment, when projected through an audio device, numeric values for these parameters may be heard by the players, 112 and 114. The audio feedback device may be a speaker built into the system 100, a speaker connected to the system 100 or audio devices worn by the players, 112 and 114 that receive information from the system 100. In yet another embodiment, a kinetic device, such as a bracelet or headband worn by the players may be used to transmit the feedback information in a kinetic format. For instance, the bracelet may vibrate more or less depending on how close the shot is to the optimum or may get hotter or colder depending on how close the shot is the optimum. Multiple feedback output mechanisms may also be employed. For instance, the feedback information may be viewed in a visual format by coaches or other spectators on a display while a sound projection device may be used to transmit the feedback information in an audio format to the players.

In general, the parameters may be presented qualitatively or quantitatively. An example of qualitative feedback may be a message such as "too high" or "too low" in reference to the entry angle of a shot by the player or "too fast" or "too slow" in reference to the entry velocity. An example of qualitative feedback may be the actual entry angle or entry velocity of the shot in an appropriate unit of measurement, such as a message of "45 degrees" for the entry angle. Again, the qualitative and/or quantitative information may be presented in different formats, such as a visual format, an auditory format, a kinetic format and combinations thereof.

With knowledge of what are optimal values of the trajectory parameters transmitted in the feedback information, the shooter 112 may adjust their next shot to generate a more optimal trajectory. For instance, if the feedback information is an entry angle and their shot is too flat, then the shooter 112 may adjust their next shot to increase their entry angle. Conversely, with their knowledge of what are the optimal values of the trajectory parameters, the defender 114 may adjust their defensive techniques to force the shooter 112 to launch a shot along a less than optimal trajectory 102. Thus, the defender 114 can experiment with different techniques to see which are most effective. In different training methods, the system 100 may be used to measure a trajectories for a shooter 112 training without a defender 114 or as is shown in the figure training with the presence of a defender 114.

The feedback information may be provided to the player before prior to the ball 109 reaching the basket or shortly after the ball reaches the basket 103. The system 100 is designed to minimize any waiting time between shots. For each shooter and for different training exercises, there may be an optimal time between when the shooter shoots the ball 109 and when the shooter 112 receives the feedback information. The system 100 may be designed to allow a variable delay time between the shot and the feedback information to suit the preferences of each shooter that uses the system 100 or to account for different training exercises that may be performed with the system. For instance, a rapid shooting drill may require a faster feedback time than a more relaxed drill, such as a player shooting free throws.

The present invention is not limited to providing feedback information for near minimum energy basketball trajectories. For instance, under some conditions, such as when a smaller player shoots over a larger player, it may be desirable for the shooter to shoot with a greater than optimal arc to prevent the larger player from blocking the shot. Thus, the shooter may use the feedback information provided by the system 100 to train for different conditions that may call for different types of shots, such as shooting over a larger player as compared to a wide-open shot. Further, the trajectory analysis systems of the present invention may be used to train in different types of basketball shots, such as bank shots, hook shots, lay-ups, jump shots, set-shots, free throws and running shots, that may requiring the mastery of different shooting skills and may have different optimal trajectory parameters. Thus, the detection system 100 may be adjustable to allow for training in different types of shots. Further, for different sports, different trajectory skills may be optimal for improving performance, which may be different than basketball. The different trajectory skills that may be required for different sports may be accounted for in the present invention.

A measure of how good a player's shooting skills may be a consistency of their trajectory parameters averaged in some manner over many shots. Typically, it has been determined empirically that better shooters have a lower variability in their trajectory parameters for a given shot, such as a free throw. Thus, to rate a shooter's performance, it may be desirable to generate trajectory parameters for a plurality of trajectories shot by a player in a trajectory session and then calculate a standard deviation for each of the trajectory parameters.

The standard deviation (SD) is a measure of the scatter of a particular set of data. It is calculated as, $$SD = [3(y_i - y_{mean})^2/(N-1)]^{1/2}$$

where $y_{mean}$ is an average value of trajectory parameter, N is the number of trajectories and $y_i$ is a value of the trajectory parameter for a particular trajectory. There are other types of statistical parameters that may be used to characterize data variability and the present invention is not limited to the standard deviation formula described above.

During a trajectory session where a plurality of trajectories are analyzed by the system 100, the trajectory parameters generated for the plurality of trajectories may be stored to a mass storage device contained in the system 100 or in communication with the system 100. After the session, the standard deviation for all the trajectories in the session may be generated. In other embodiments, to provide measures of variability of different data sets representing different playing conditions, the system 100 may divide the trajectory data into different subsets, such as grouping according to types of shots, locations of shots, shots where the shooter is guarded, shots where the shooter is unguarded, made shots, swished shots, missed shots, shots made earlier in the session versus shots made later in the session, and combinations of these groupings.

The statistical variability calculated from the different data sets may be used as a guide by the system for suggesting methods that will improve the player's shooting skills. The system 100 may include software for suggesting methods based upon the statistical analysis. For instance, the system 100 may determine that a player's shot variability is greater when they are guarded as opposed to unguarded, thus, exercises may be prescribed to the player that focus and shooting while guarded. As another example, the player's shot variability may be greater later in a session as opposed to earlier in a session or greater in a training session before practice as opposed to after practice, thus, the system may suggest the player work on their aerobic conditioning. In yet another example, the player's shot variability may vary as a function of a distance from the basket and the system may suggest the player concentrate on shots at the distances where the variability is greatest. In FIGS. 7 and 8, plots of data from a trajectory session and predictions of improvement using statistical analysis are described.

In some embodiments, the trajectory session data and other information generated by the system 100 may be viewed via a number of different output mechanisms, such as a hard copy from a printer or a display. For example, a printer connected to the system 100 may be used to generate print-outs of trajectory session data in different formats. As another example, a display interface in communication with the system 100 may be used to view trajectory session data in different formats. In particular, the system 100 (see FIGS. 5A-5C) may include a touch screen interface for viewing trajectory session data and providing input parameters into the system. As another example, the system 100 (See FIG. 4) may communicate with a portable viewing device capable of interfacing with the system 100.

Information generated with system 100, such as trajectory data from a plurality of trajectories in a trajectory sessions, may be archived. The archival storage system may be a remote storage device in communication with the system 100 or may be a mass storage device provided with the system 100. The archival storage system may include raw data of physical information recorded by the camera 118, such as video frame data, as well as, trajectory parameters and other information generated from analysis of the raw data. The archival data may store trajectory session data for a plurality of different trajectory sessions by one or more different players.

By accessing the archival data, an improvement over time for a particular parameter generated by the system 100, such as a shot variability parameter, may be assessed. Further, the archival data may be used for data mining and video editing purposes. For instance, in a video editing application, the graphic of the player's average trajectory may be integrated with video data of the player shooting. In another example, video clips of two or more different players shooting may be compared or video clips of a single player shooting during different trajectory sessions may be compared to show the player's improvement. In data mining applications, the video data may be further analyzed to characterize a player's shot mechanics. In another application, simulations may be generated to predict gains in team performance based-upon improvements in individual performance on the team. This type of simulation may require archival trajectory session data to be analyzed for a plurality of different players.

In some embodiments, the archival data may be accessible via a remote connection. For instance, a password-protected web-site may be used as a portal for accessing archival data generated from system 100. The web-site may allow clients, such as players, coaches, or scouts to gain access to the web-site from remote sites, such as home computer connected to the Internet or a portable computer connected to the Internet. The web-site may include a plurality of analysis tools and a graphical interface for viewing graphical data from the applications in different formats. In another embodiment, the archival data may be downloaded to a CD, DVD or other portable storage medium that the player can take with them. Analysis software may also be downloaded with the archival data so that the player can analyze the data on another computer.

Information generated during a trajectory session may be stored in a database. The database may relate player identification information, such as a name, an address, a team, a session time, a session location, a session data to raw data recorded during the trajectory session and information generated during the trajectory session. The database may be used for player tracking purposes and targeting services to players that have used the trajectory system.

FIG. 2 is a diagram of captured video frame data used to generate a curve-fit for a trajectory of an object. As described with respect to FIG. 1, in a machine vision system, images of objects may be recorded by a camera, digitized and converted into frame data. Four captured video frames, 200, 201, 202, 203 are shown. The digitized frames capture an image of the ball 109 at times, t1, t2, t3 and t4 as it approaches the basketball hoop 103.

Pattern recognition software may be used to determine the location of the ball 109 from other images that may be captured. In one embodiment, a reference frame is captured without a ball and the reference frame is compared with the frames, such as 200, 201, 202, and 203 that contain the ball 109. In cases where the reference frame is relatively fixed, i.e., the only moving object is the ball 109. The ball 109 can be identified via subtraction of the frames. The system may capable of updating the reference frame as needed to account for new objects that have moved into the frame or have been removed from the frame.

When there is a lot of noise in the frame, such as people or other objects moving around in the frames, as well as the basketball, then more complex filtering techniques may be applied. In one embodiment, a data capture zone 214 may be identified in each frame. The data capture zone 214 may be used to eliminate any noise sources that may be mistaken for the basketball and may be also be used to reduce the computational resources required to analyze the frame data. For instance, the processing of the video frame data may be limited to the data capture zone or one or more other areas of interest within the captured frame. There are many pattern recognition and filtering techniques that have been developed for robotics, where machine vision is used, that are well known in the arts that may be applied to the present invention. Further, there are many techniques that have developed for signal or pattern recognition in noisy environments, such as those that have been developed for recognizing valid aircraft radar signals and tracking moving objects in commercial or military applications, that are well known in the arts that may be applied with the present invention.

Once the position of the object is determined from each frame. A curve-fit for the trajectory may be developed in a computational space 205 with a coordinate system 216. In the figure, for illustrative purposes only, four points, 206, 207, 208 and 209 corresponding to times t1, t2, t3 and t4 are shown. As needed, additional frames may be used to properly fit the data. For the basketball, the trajectory is assumed to be parabolic and a parabolic curve-fit may be generated using a least squares curve-fit. The parabolic curve-fit accounts for gravitational forces and neglects forces generated from drag and aerodynamic forces resulting from spin. However, more complex trajectory curve-fits may be modeled in the present invention that account for drag and spin. These curve-fits may be more desirable for analyzing the trajectories of objects, such as a baseball, a football, a tennis ball, a soccer ball or a volleyball, where aerodynamic forces due to spin or drag are more important.

In one embodiment, curve-fits 210 for x and y position may be parameterized as a function of time using a time at which each frame was recorded. In another embodiment, a curve-fit of height (y) as a function of distance (x) in the coordinate system 216 may be generated. Using the curve-fit, trajectory parameters, such as an entry angle 211 and the entry velocity 212 of the object as it enters the hoop, is near the hoop or at other states along the trajectory may be generated. For instance, the entry angle 211 may be generated from the tangent of the curve-fit at the termination point 213. The entry velocity 212 may be generated from derivatives of the parameterized equations 210 at the time corresponding to the termination point 213. If the release time is known, then the release velocity and release angle may also be determined from the parameterized trajectory equations.

In one embodiment, trajectory parameters may be generated without curve-fitting the entire trajectory. For instance, with enough position data near a particular location on the trajectory, such as the termination point 213, then an entry angle may be calculated by simply fitting a line through available data points near the termination points. As another example, some trajectories may be non-parabolic but a parabolic curve-fit may be sufficient for estimating a trajectory parameter, such a velocity, near a particular location.

In some embodiments, trajectory parameters may be generated for a portion of a trajectory captured in video frame data and analyzed in a manner described above. The trajectory parameters may be provided as feedback information to a user of the system. For example, a trajectory system as described with respect to FIG. 1, may be setup on the side of a baseball field and trajectory parameters, such as a release velocity, a release angle, a spin rate and a release height for a thrown baseball, may be generated with the present invention. The trajectory system may only detect and analyze the portion of the trajectory of the baseball near the throwing release point. One or more of the trajectory parameters or a combination of the trajectory parameters generated from the portion of the trajectory that is detected and analyzed may be provided as feedback information to a baseball pitcher trying to improve their throwing skills. The pitcher that has thrown the ball can evaluate the outcome of the pitch according to where it is caught by a catcher.

A similar approach could be applied to a football kicker kicking a football or a soccer player kicking a soccer ball. In these instances, a trajectory detection system may be setup on the side of the field. The system may capture video frame data that is used to generate trajectory parameters of the football or soccer ball's trajectory as it leaves the player's foot and provide feedback information. The player kicking the ball can then compare the feedback information to the success of the kick. For instance, how far the ball traveled, whether a field goal was made or whether a soccer goal was made.

In another embodiment, trajectory parameters may be generated for two or more trajectory segments that are captured by video frame data and analyzed in the manner described above. For example, as described with respect to FIG. 1, a trajectory detection system may be setup on the side of a tennis court and the system may be used to measure trajectory parameters for a tennis ball tossed by a player to initiate a serve. The toss of the serve is the first trajectory segment. The trajectory detection system may generate trajectory parameters and feedback information for the toss, such as a toss angle and a toss velocity and a release height for the toss. Then, the player may strike the tennis ball with a tennis racket to launch the tennis ball along the trajectory. The trajectory detection system may generate a second set of set of trajectory parameters and feedback information for the second segment, such as, a height at which the ball is struck, an angle at which it leaves the racket, a velocity at which it leaves the racket and a spin on the ball after it leaves the racket.

In another example of providing feedback information to two trajectory segments, the trajectory detection system may generate trajectory parameters and feedback information at the release point of a thrown baseball as described above. Then, the trajectory detection system may detect a portion of the baseball trajectory as it crosses the plate and then generate trajectory parameters for this portion of the trajectory, such as a height at which the ball crosses the plate and a velocity as it crosses the plate. These trajectory parameters for the second trajectory segment may be provided as a second set of feedback information to the pitcher.

FIG. 3 is a diagram of a trajectory capture and feedback scenario employing a trajectory detection and analysis device of the present invention. In this embodiment, a machine vision system employing 3 cameras 165 and 3 infrared emitters 164 is mounted above the backboard 151 and the basketball hoop 103. The 3 cameras and 3 infrared emitters may be enclosed within a housing 170. In another embodiment, the 3 cameras and 3 emitters may be integrated into the backboard 151. Different multiple camera configurations may be used and the present invention is not limited to three infrared cameras mounted in a linear arrangement fairly close together. For instance, one embodiment of the present invention two cameras may be placed on opposite sides of the playing surface 109, i.e. across the court from one another. Output from both cameras may be transmitted to a logic device for processing.

The backboard 151 is attached to a basketball pole, which is fixed to the ground. In other embodiments, the machine vision system may be mounted to a backboard 151 that is attached to a portable supports allowing the basketball goal to be moved around on a playing surface 109. The support may also allow for the height of the goal to be adjusted. The machine vision system may be mounted to a backboard 151 with a hoop 103 that is located outside. When the trajectory system is used outside, the housing 170 may be water-proofed to prevent water damage to the system.

The infrared emitters 164 may be used to illuminate objects that enter the detection volume 110, such as ball 159 and ball 160. The infrared light reflected from the objects may be detected and recorded by the cameras 165. When the cameras record both infrared and visible light, the cameras 165 may also include filters for minimizing visible light captured in a video frame to enhance the infrared signature of objects. Using video frame data from the three cameras 165 with the known distances between each camera 165 and geometric relationships, trajectory parameters may be generated for trajectories of basketball's shot from anywhere on the playing surface. For instance, when the playing surface is a basketball court, then trajectories may be analyzed from basketball's shot anywhere on the court or even from beyond the boundaries of the court. This analysis capability differs from the machine vision system with a single camera that was described with respect to FIG. 1. In the system of FIG. 1, the active area from which a player could shoot a shot and have it detected and accurately analyzed was more limited.

An advantage of the infrared system is that the intensity at which an object is illuminated decreases non-linearly according to the distance of the object from the emitters 164. Thus, objects close to the emitters are clearly illuminated by objects but background objects that are far away from emitters 164 are not illuminated. As was described with respect to FIG. 2, with a camera that records in visible light, filtering methods may have to be applied to a series of video frames to distinguish the basketball from the movement from other objects that may be moving in the series of video frames, such as spectators. With the infrared system, since only objects close to the infrared emitters 164 are clearly illuminated, i.e., objects within the detection volume 110, the need to apply complex filtering algorithms to account for the movement of other objects in the video frames may be eliminated. For instance, the infrared system may be able to detect and analyze trajectories of basketballs in an arena or gymnasium where there are many spectators in the field of view of the cameras 165.

Another advantage of the infrared system is that the basketballs 159 and 160 may be marked with invisible infrared marking that are only visible in infrared light. Thus, the players 152 and 153 shooting the balls 159 and 160 marked with invisible infrared symbols would not be able to distinguish them from unmarked balls. The balls may be marked with a symbol or series of symbols to allow them to be distinguished by the system and associated with a particular player. For instance, ball 159 may be marked with a plurality of triangles and ball 160 may be marked with a plurality of squares in invisible ink that either glows under infrared light or absorbs infrared light allowing the symbols to be detected by the machine vision system. In addition, the balls 159 and 160 may be marked with visible symbols to allow the players to distinguish between the balls.

The invisible infrared marking may also be used to aid in generating trajectory parameters. For instance, each of the seams of the basketballs 159 and 160 may be marked with different invisible symbols or patterns allowing the spin rate of the basketball and the orientation of the basketball to be measured. In general, the detection systems of the present invention may be used to measure one or more of the following trajectory parameters for a basketball's trajectory: a release height, a release angle, a release velocity, an entry angle into a basketball hoop, an entry velocity into the basketball hoop, an entry position of a center of the basketball relative to a center of the basketball hoop, a transverse velocity of the basketball relative to a normal line drawn through the center of the basketball hoop, a missed shot, a made shot, a rotation rate of the basketball and axis of rotation of the basketball. Feedback information may include one or more of the trajectory parameters or combinations of the trajectory parameters, such as a ratio of entry velocity to entry angle.

The trajectory parameters that are generated may vary from system to system depending on the sensors used in each system. As described in FIGS. 1 and 3, with the present invention, machine vision systems may be employed that use one or more cameras. The use of multiple cameras may provide measurement capabilities not possible with a single camera and hence capabilities to generate different trajectory parameters as compared to a single camera system.

Further, the present invention is not limited to machine vision systems for detecting trajectories. Other types of sensor systems may be able to generate different trajectory parameters than the machine vision systems. For instance, there are many types of sensors systems that use different types of emitters and detectors to detect the motion of objects. In these sensor systems, the emitter emits an energy signal and the detector detects a reflected energy signal from the object. These systems may be based on electromagnetic energy signals, such as radar signal or a laser signal, or even acoustic energy signals.

As another example, non-intrusive sensors, such as accelerometers or vibration sensors, may be integrated into the object, such as 159 or 160, a device worn by the players, 152 or 153, or other associated equipment, such as the backboard 151 and the hoop 103. Information from these non-intrusive sensors may be utilized by the trajectory detection system. In particular, a small (silicon chip based) sensor system with a Radio Frequency Identification (RFID) tag may be integrated into an object, such as a basketball. The sensor chip may include sensors for measuring accelerations and rotation rates for the object along its trajectory. A microprocessor on the chip may be used to process the sensor data and an antenna may be used to broadcast signals to an RFID tag reader. The sensor chip may be powered by an electromagnetic energy received from the RFID tag reader. As another example, the non-intrusive sensors, such as a sensor chip, may be integrated into items worn by the player, such as player's shoes or integrated into their clothes. These sensors may allow the trajectory system to detect forces that a player's generates while launching an object, such as the directional forces, a player, such as 152 or 154, generates during a basketball jump shot. With this type of information, the player's release time may be correlated to where the player is in their jump, i.e., is the ball released at the peak of their jump, on the way up or on the way down. Also, information, such as whether the player jumps straight up and down, forward or backward or side-to-side may be determined. These types of sensors may be denoted as non-intrusive because a player using a ball with these types of sensors or wearing these types of sensors is not likely to be aware of there presence unless directly told about their presence. However, in general, any type of sensor that does not interfere with the player's normal play of the game may be considered non-intrusive. For instance, a small sensor package worn by the player may be considered non-intrusive if it does not interfere with their play even though the player may be aware of the sensor package.

The present invention is not limited to one type of sensor system. For example, in some embodiments, combinations of sensor systems, such as a machine vision system, non-intrusive sensors integrated into the launched object, non-intrusive sensors worn the player and emitter/detector systems may be used with the trajectory systems of the present invention.

Further, the feedback information generated by the system may not be limited to trajectory parameters regarding the object's flight. For instance, as described in the previous paragraph, non-intrusive sensors may be used to measure forces that a player generates while launching an object or a position of the player during and after the launch of an object, such as shooting a basketball. Parameters regarding this information may be generated by the trajectory system and provided as feedback information to a system client, such as 152, 153 and 154.

Returning to FIG. 3, two players, 152 and 153, are shown shooting two balls, 159 and 160, that are in flight at the same time. The trajectory system may be capable of generating trajectory parameters and feedback information for two or more object with trajectories in flight at the same time, such as 161 and 162. When two objects collide before reaching the basket 103 and are deflected, the trajectory system may be capable of determining whether a shot would have been made based upon trajectory data measured before the objects collided.

Methods may be used by the system to distinguish between two or more players that have shot a ball while using the trajectory system. For instance, as described above, the ball used by each player may be marked in some manner allowing the system to distinguish between which of the two or more players has shot a ball. In another example, non-intrusive sensors worn by the player or markings on clothes worn by the player may allow the system to distinguish between players. The non-intrusive sensors may allow the system to determine when a particular player has shot the ball. The markings on the clothes, such as a different jersey worn by each player using the system, may allow the system to distinguish between players.

When the system can distinguish between two or more players using the system simultaneously, trajectory session data may be generated and archived for each player, which may be advantageous. Also, when the system can distinguish between players, the system may be able to provide personal feedback information to each player via feedback interfaces worn by the players. For instance, player 152 that has shot the ball 159 is wearing a feedback interface device 164, which provides feedback information in a kinetic format and player 153, which has shot the ball 160 is wearing a feedback interface device 164, which provides feedback information in an auditory format. In this embodiment, the system detects and analyzes the trajectories of balls, 159 and 160, generates trajectory parameters, determines which player has shot which ball and provides feedback information to each player via their respective feedback interface devices, 163 and 164. The feedback information is sent to each player's feedback interface device via a wireless communication interface used by the trajectory feedback system.

In another embodiment of the present invention, to provide feedback information two or more players using the system simultaneously, the trajectory system may use shot location to distinguish between players. The trajectory curve-fits may be used to determine a location where a shot was initiated. Thus, the two or more players may be assigned a particular area on the playing surface 109 in which to shoot. Then, the system may store data from each shot area that has been assigned to a particular player to a storage area for that player. The players may be assigned a particular communication frequency for their feedback interface device. Since the player is identified from the location from which the shot originated, the proper communication frequency for sending feedback information to each player may be selected.

In yet another embodiment, one or more players may shoot from one side of the basket 103 and one or more players may shoot from the other side of the basket 103. A speaker, such as 167 mounted to backboard 151 or a speaker located on the playing surface 109 on the same side of the backboard 151 as the speaker 167, may provide audio feedback information for shots originating from the side of the basket 103 where the speaker 166 is located. A speaker, such as 167 mounted on the other side of the backboard 151, may provide feedback information for shots originating from the side of the basket 103 where this speaker is located. In another embodiment, the players, 152 and 153, may take turns shooting and the speakers 166 and 167 may project the same feedback information to the player that has shot the ball. The speakers 166 and 167 are optional and all backboard mounted systems may not include backboard mounted speakers, such as 166 and 167.

The trajectory system may generate feedback information that is received by system clients other than the shooters. For instance, coaches and spectators may desire feedback information for player's using the system. For instance, a system client 154, such as a coach, a scout or a spectator, may receive feedback information via a visual display tablet 155 via wireless communication 156 from the trajectory system. When multiple players are using the system, the system client 154, may be able to view feedback information for two or more players simultaneously or may be able to select feedback information from an individual player for viewing. For each player, the display tablet may allow the system client to view the feedback information in different formats, to view trajectory session data for the current trajectory session and to view archived trajectory session data from previous trajectory sessions to determine a player's training progress and may be able to view records of a training program that a particular player is following. In general, the system may be able to support simultaneous communications with a plurality of different peripheral devices that may be used by system clients including but not limited to hand-held computing devices, displays, wearable sound projection devices, kinetic feedback devices, printers and remote servers.

The functions of the trajectory systems of the present invention may be provided in a device with a single housing or more be divided among a number of different devices with separate housings. In addition, the trajectory system may be constructed in a modular fashion to allow different modules to be added to provide increased functionality. For example, one trajectory system may include the infrared emitters 164, cameras 165, logic devices for processing the video data and generating feedback information and a wireless communication interface for communicating with the feedback interface devices and other peripheral devices, such as the remote server 157. The emitters, cameras, logic device and wireless communication interface may be enclosed in as single housing 170. If desired, the trajectory system may be configured to communicate feedback information to additional feedback output mechanisms that may be connected to the system, such as speakers 166 and 167. The devices in the housing 170 may be configured with a number of different settings. For the backboard mounted system, control inputs may be provided through a feedback interface device with a touch screen or other input controls, such as display tablet 156.

The system in housing 170 may not include storage and session analysis capabilities or only limited storage and session capabilities. For instance, it may only store data from a current session and may not archive data in a database containing records for a plurality of different players. However, these features may vary from system to system. In one embodiment, the trajectory detection system component 150 may comprise a mass storage device, a logic device, a display and a printer for storing, analyzing and outputting trajectory data accumulated over a trajectory session and a database for storing records from a plurality of different players. This device may be added as a modular component to the system in housing 170. The plurality of trajectories may be analyzed by the system enclosed in housing 170 and then transmitted via wireless communication 158 for storage and analysis to the trajectory detection system component 150. A remote server 157 may provide this functionality. Many trajectory system and component configuration are possible with the present invention and the examples of system modularity and division of functionality between system components has been provided for illustrative purposes only.

FIG. 4 is a block diagram of a trajectory detection and analysis system 100 of the present invention. As was described with respect to FIG. 3, the components of the system 100 may be enclosed within a single housing or may be divided between a plurality of different housings enclosing different components of the system. Further, the system 100 may include different components that are not shown, such as the peripheral devices and remote servers described with respect to FIG. 3.

Physical information 216 is input into the system 100 via sensors 212. In one embodiment, a machine vision system may be used where the machine vision system comprises one or more cameras 201 (e.g., a CCD camera) and a video capture card 203 for digitizing captured frame data. The video capture card 203 may capture color pixel data. The camera 201 may employ a 3.5-8 mm zoom lens and may allow for different lens attachments. In another embodiment, the system may employ a plurality of cameras arranged on a mechanism that allows different type cameras to be rotated or moved into place where only one camera is used at a time to record frame data. The different cameras may allow the detection volume of the system to be adjusted.

The digitized frame data from a machine vision system and other sensor data may be processed by a computer 202. The computer 202 may be a modified PC using a 1.6 GHz processor 204 w/RAM and a CD-RW drive 205 for inputting and outputting data and software. The computer 202 may also include a mass storage device, such as hard drive 207 and various network/device communication interfaces, such as wireless and wired network interfaces, for connecting to a local area network (LAN), wide-area network (WAN) or the Internet. The device communication interfaces may allow the computer to communicate with a plurality of peripheral devices and other remote system components.

The computer 202 may include operating system software 206 for controlling system resources, such as feedback interfaces 213 and the system input/output mechanisms 215. The computer 202 may be used to execute analysis software 208 for analyzing trajectories using the sensor data from sensors 212 and for generating feedback information 217. The analysis software 208 may include software for providing various services, such as 1) providing a list or a plot of trajectory session information comprising one or more of physical information, trajectory parameters and feedback information for the plurality of trajectories, 2) comparing the trajectory session information from the trajectory session with trajectory session information from one or more different trajectory sessions, 3) generating trajectory session parameters used to characterize a human's performance in the trajectory session, 4) predicting performance improvement as a function of the trajectory session parameters, 5) prescribing actions for improving performance and 6) performing video editing tasks. The computer 202 may also be used to execute database software for relating physical information 216 and other information generated by the computer 202 to player identification information (e.g., name, age, address, team, etc.) and session identification information (e.g., time, data, location, number of trajectories analyzed, types of shots, etc.).

Power to the computer 202 and other devices may be provided from the power supply 209. In one embodiment, the power supply 209 may be a re-chargeable battery or a fuel cell. The power supply 209 may include one or more power interfaces for receiving power from an external source, such as an AC outlet, and conditioning the power for use by the various system components. In one embodiment, for in-door/outdoor models, the system 100 may include photocells that are used to provide direct power and charge an internal battery.

Feedback information 217, used by clients of the system 100 to improve their trajectory skills, may be output through one or more feedback interface devices 213, such as a sound projection device 211. In general, the system may be capable of outputting feedback information 217 to a plurality of different devices simultaneously in a plurality of different formats, such as visual formats, auditory formats and kinetic formats.

The system 100 may support a plurality of different input/output mechanisms 215 that are used to input/display operational information 218 for the system 100. The operational information 218 may include calibration and configuration setting inputs for the system and system components. In one embodiment, a touch screen display 210 may be used to input and display operational information 218 using a plurality menus. Menus may be available for configuring and setting up the system 100, for allowing a player to sign into the system and to select preferred setting for the system 100 and for viewing session information 219 in various formats that have been generated by the system. The printer 214 may be used to output hard copies of the session information 219 for a player or other client of the system 100. The present invention is not limited to a touch screen display as an interface for operational information. Other input mechanisms, such as but not limited, a key board, a mouse, a touch pad, a joystick and a microphone w/voice recognition software may be used to input operation information 218 into the system.

FIGS. 5A-5C are perspective drawings of a trajectory detection and analysis system 100 for one embodiment of the present invention. A camera 201 used in a machine vision system, a touch screen display 210, a computer 202 and a sound projection device 211 are integrated into a housing 300 with a support chassis 301. The system 100 may also include an amplifier for the speaker 211 (not shown). Other devices described with respect to FIG. 4 that are not shown, such as a power supply, may also be integrated into the housing.

Wheels 304 are attached to the chassis 301 to allow the system 100 to be easily moved and positioned for use, such as on the side of a basketball court or another location where the system is employed. In general, the chassis of devices of the present invention may be designed with a weight and a form factor, which may facilitate transport, storage and unobtrusive set-up, calibration and operation of the device. For instance, the device includes a handle 303 attached to panels 300 comprising the housing that may be used to move the device and which may aid in set-up and storage of the device.

The speaker 211 takes up a large portion of the internal volume of the system. In one embodiment, a travel system may be used that incorporates a portable computer system such as laptop that is connected to a machine vision system with the camera 201. To use the travel system, it may be placed on top of a support platform, such as a tripod, a table, or a chair. The support platform may be positioned on the side of a basketball court. The travel system may provide feedback information via a wireless communication interface to audio device, such as an "earbud," worn by the player. In another embodiment, the travel system may generate output signals that may be routed through a portable audio system (e.g., a boom box) for amplification via speakers on the audio system to provide feedback information.

FIG. 6 is an information flow diagram for a trajectory detection and analysis system of the present invention. A sensor system 502, which may comprise emitters 506 and detectors 506, receives physical information 507. The physical information 507 may be energy signals reflected from a tracked object 508. In the case where sensors are mounted to the tracked object 508, then the physical information 507 may be sent as signals from the sensors to a detector 504. Typically, the physical information 508 is transmitted through a medium such as air.

The sensor system 502 may convert the physical information 507 to sensor data signals 509. For instance, a charge coupling device generates electronic signals in response to photons striking a sensor array. The sensor data signals 509 may be sent through a wired or wireless connection to a sensor interface 510, which provides signal conditioning. The signal conditioning may be needed to allow the sensor data 509 to be processed. For instance, in the machine vision system described with respect to FIGS. 1-4, prior to analysis, the video frame data is digitized by a video capture card.

In 513, the conditioned signals 511 may be processed according to system control software and according to trajectory analysis software 513 using set-up and control inputs 512 that have been input into the system. The system control software 513 may analyze portions of the data 511 to determine whether the sensor system 502 is operating properly. Based-upon the analysis of the data 511, the system control software may provide calibration instructions and other operational instructions to the sensor system which may be transmitted to the sensors via the sensor interface 510.

The trajectory analysis software 513 may be used to process the conditioned signals 511 and generate trajectory parameters. The trajectory parameters may be used to generate feedback information. The feedback information may be one or more trajectory parameters or a combination of trajectory parameters, such as a ratio of trajectory parameters or a product of trajectory parameters that may be useful to a system client in improving their trajectory skills.

Depending such factors as the application (trajectory of a specific type of object), the set-up and components of the system, the environment in which the system is used and what portion of the trajectory of an object the device is used to measure, the present invention may provide feedback to the player nearly immediately, within a second or within 10 seconds as measured from some time state along the trajectory that has been analyzed by the system. For instance, when information on the beginning of the trajectory is directly generated by the system, then the time to provide feedback may be measured from the time when the trajectory is initiated and then first detected by the system. When information on the end of the trajectory is directly measured, then the time to provide feedback may be measure from the time to when the trajectory has neared completion and has been detected by the system.

The feedback information may be sent as feedback information parameters 516 to one or more device interfaces 517. The device interfaces 517 may communicate with a plurality of feedback devices. The device interfaces 517, which may include device drivers, may transmit device data/commands 518 to a feedback device interface 519 located on each feedback device. The device data/commands 518 may be used to control the operation of the feedback devices. The output from the feedback device may also be modified using set-up/control inputs 520 that may vary for each device.

The feedback devices may output the feedback information parameters 516 received as device data 518 in one of an audio, visual or kinetic format 521 depending on the capabilities of the feedback device. For example, the device interface 517 may send device data/commands 518 to a display that allows a numeric value of a feedback information parameter 516 to be viewed on the display by one of the system clients 522, such as players, coaches and spectators. As another example, a device interface 517 may send device data/commands 518 to an audio output device that allows feedback information parameters 516 to be output in an audio format to one or more of the system clients 522.

The feedback parameters 516 generated from the trajectory analysis software 513 and other raw data generated from the sensor system 502 may be sent to session storage 515. The session storage 515 may accumulate trajectory data from a plurality of trajectories generated during a trajectory session for one or more players. All of a portion of the trajectory data 514 may be sent to archival storage 525 when the session has been completed. For example, only a portion of the raw data, such as video frame data, may be sent to archival storage. Further, the data may be filtered for bad data prior to being sent to archival storage 525. The archival storage 525 may include a database used to relate trajectory data from one or more trajectory sessions to the conditions of the trajectory session, such as time place and location, and player identification information.

The archival data 524 and session data 514 may be used to provide one or more services 523 including but not limited to 1) a session record of trajectory parameters (see FIG. 7), 2) session diagnostics, 3) prescription for improvement (see FIG. 8), 4) a history comparison of trajectory data from different sessions, 5) individual/group comparisons of trajectory session data, 6) video analysis and editing tools, 7) simulations (e.g., predicting a team's improvement based upon improving one or more members of the teams shooting skills and 8) entertainment. As an example of entertainment, a player's trajectory average trajectory parameters and variability may be used in trajectory simulations for a video basketball game or another game where the parameters have been measured. Two players that have used the system 100 may both enter their parameters and compete against one another in the video game. The player may also use the game to see how they match up against professional or collegiate athletes who have had their trajectory parameters defined.

Output from the data services 523 may be converted to a portable record 527, such as print-out from a printer, or may be formatted for viewing on a graphical interface 528. The graphical interface may also include a storage capacity allowing data to be viewed at a later time. The output from the data services 523, such as a portable record 527 or information viewed on the graphical interface 528, may be used by the system clients 522. The data services 523 may also be provided via a data mining interface 526. The data mining interface 526 may include analysis tools and a graphical interface. When the archival storage is remotely accessible, it may be used to access archived data 524 via a remote connection, such as from the Internet.

Information passed between the different components in the system as described with respect to FIG. 6 may be transmitted using a number of different wired and wireless communication protocols. For instance, for wire communication, USB compatible, Firewire compatible and IEEE 1394 compatible hardware communication interfaces and communication protocols may be used. For wireless communication, hardware and software compatible with standards such as Bluetooth, IEEE 802.11a, IEEE 802.11b, IEEE 802.11x (e.g. other IEEE 802.11 standards such as IEEE 802.11c, IEEE 802.11d, IEEE 802.11e, etc.), IrDA, WiFi and HomeRF.

FIG. 7 is a shot scatter plot 400 that may be provided by a trajectory detection and analysis system. The shot scatter plot 400 shows entry velocity 402 (feet per second) versus entry angle 404 (degrees) for a plurality of different shots that were generated during a trajectory session. As was described with respect to FIG. 1, the entry velocity 402 and entry angle 404 are trajectory parameters that may be generated from a trajectory detection system of the present invention and provided as feedback information to the player using the system during the trajectory session.

The basketball shots are divided into three categories, swish 406, rim-in 408 and miss 410. Swish shots 406 pass through hoop without touching it. Rim-in shots 408 hit the rim and then pass through the hoop. Miss shots 410 do not pass through the hoop. The plot 400 may be used to provide the player a visual record of how well they did in the session and how much entry angle and entry velocity vary from shot to shot. If the shots were all taken from the same location, such as the free throw line, then a margin error of for the shot may be gauged approximately from the figure. The margin of error can be gauged because the plots shows which combinations of entry velocity and entry angle lead to made shots and which combinations lead to missed shots.

FIG. 8 is an improvement map 420 that may be provided by a trajectory detection and analysis system of the present invention. The map 420 is a function of the release height of the shot, which 9 feet and 6 inches, and the average entry angle, which is 41 degrees. The improvement map 420 provides contours of a percentage of shots made as a function of velocity variability 414 and an angle variability 412. The velocity variability 414 and angle variability 412 may be calculated as a statistical deviation generated from a plurality of shots taken during a trajectory session. As the angle variability 412 and the velocity variability 414 approach zero for a particular shot, the shooting percentage approaches 100%.

For an initial trajectory session, a baseline 416 of velocity variability and entry angle variability is about 0.4 and 1.4 respectively. This variability pair provides for a shooting percentage in the range 40-50 percent. The improvement map 420 predicts that if the player reduces their velocity variability to about 0.2 and their angle variability to about 1, then their expected improvement 418 will be an increase in shooting percentage to about 70-80 percent from 40-50 percent.

Using this improvement map, the player may be prescribed a series of training exercises that will improve their angle variability 412 and velocity variability 414. If the player participates in a plurality of trajectory sessions, then angle variability and velocity variability for each session may also be plotted on the improvement map. Thus, the player can see how they are approaching their goal as a function of time. Further, the player can use the trajectory system to verify that their shooting percentage is actually increasing as their velocity variability and angle variability is decreased. Also, they can compare their actual shooting percentage with the predictions generated in the improvement map 420.

FIGS. 9A and 9B are flow charts of methods for providing trajectory detection and feedback using a trajectory detection and analysis system. In FIG. 9A, a method of detecting, analyzing and providing feedback information for a trajectory is described. In 600, the system receives sensor data, such as video frame data from a camera, from the sensor system regarding the motion of an object along a trajectory. In some embodiments, the system may be capable on analyzing the trajectories of two or more objects simultaneously. In 606, using the sensor data 606, the system generates one or more trajectory parameters from sensor data that describe an aspect of the object's trajectory. In 608, using the trajectory parameters, feedback information is generated. The feedback information may be one or more of the trajectory parameters or a combination of trajectory parameters. In 610, the feedback information is provided to one or more system clients, such as a player or coach. The feedback information may be provided to the client via a feedback output mechanism, such as a sound projection device or a visual display device.

In another embodiment, the method may also comprise generating one or more aggregate trajectory parameters, such as a statistical deviation, from the trajectory parameters from a plurality of different trajectories where the aggregate trajectory parameters characterize the human's consistency. The aggregate trajectory parameters may be a measure of statistical variability of different trajectory parameters. Thus, the method may also comprise predicting performance improvement as a function of the one or more aggregate trajectory parameters and generating a prescription comprising one or more actions for improving performance.

In FIG. 9B, a method of detecting, analyzing and providing feedback information for a trajectory is described using a machine vision system. In 601, video frame data of an object along to trajectory is recorded using one or more cameras in a machine vision system. Prior to recording the object along its trajectory, a reference frame without the object may be generated and the machine vision system may be calibrated by recording images of the object at prescribed positions relative to the one or more cameras. In 602, the frame data captured from the one or more cameras may be digitized using a video capture card. In 603, the position of the object in each of plurality of captured video frames may be determined Filtering and pattern recognition methods may be applied to pick out the object in the video frames. The position of the object in each frame varies as the object travels along its trajectory. In some embodiments, two or more objects that are in flight at the same time may be captured in the video frame data and the system may be capable of determining trajectories for each of the objects.

In 604, a trajectory curve-fit may be generated for the object using the position data from the video frames. Using time data from each frame, the curve-fits of the object's trajectory may be generated as a function of time. Also, curve-fits of the object's height as a function of distance may also be generated. In 606, using the curve-fits and/or the position data from the frames, trajectory parameters may be generated for the trajectory. In 608, using the trajectory parameters, feedback information is generated. In 610, the feedback information, via an output mechanism, is provided to one or more system clients, such as a player or coach.

Figure 10:
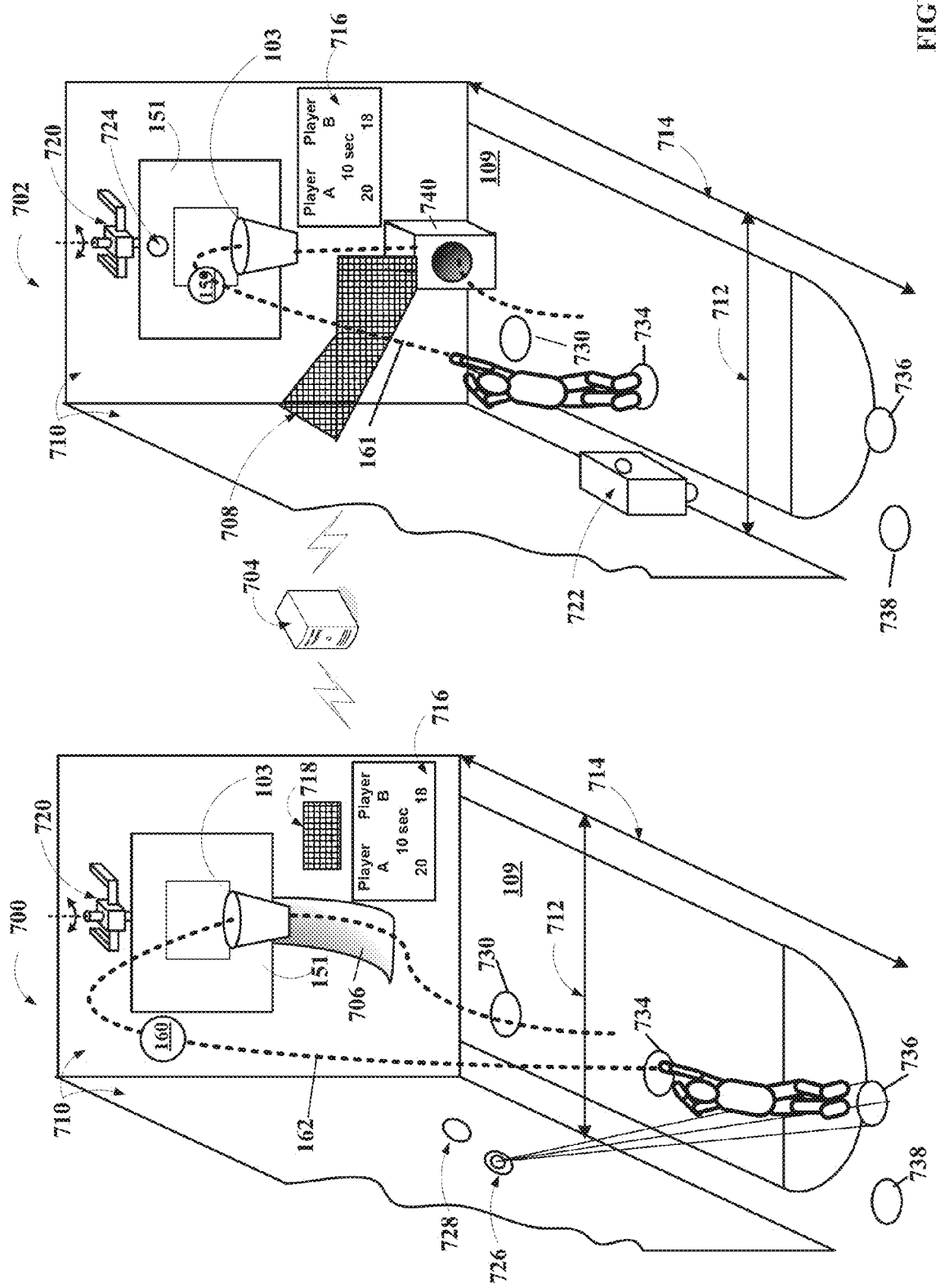
FIG. 10 is a perspective drawing of two embodiments of basketball training systems.

FIG. 10 is a perspective drawing of two embodiments of basketball training systems, 700 and 702. The basketball training systems of the present invention may use any of the embodiments of the trajectory detection, analysis and feedback systems and devices previously described herein. Thus, in FIG. 10, the particular embodiments of trajectory detection, analysis and feedback systems and their associated devices are provided for illustrative purposes only.

The basketball training systems, 700 and 702, may each comprise a playing area 109, a basketball hoop 103, a backboard 151 and trajectory detection, analysis and feedback system. In the basketball training system of 700, the trajectory detection, analysis and feedback system comprises a camera 728, an audio feedback device 718, a visual feedback device 716 and a logic device, such as computer 704, for performing trajectory analysis and generating feedback information. In basketball training system 702, the trajectory detection, analysis and feedback system comprises a fixed camera 724 mounted to backboard 151, a movable trajectory device 722 and a visual feedback device 716. In particular embodiments, the camera 724 may be designed to allow it to be mounted in various locations, such as clipped to the backboard or mounted to the wall adjacent to the backboard. The movable trajectory device 722 may include calibration software and settings that allow different mount locations for camera 724 to be utilized.

In 702, the movable trajectory device 722 may comprise a camera that is used in a machine vision system, a touch screen display, a computer and a sound projection device integrated into a housing, as is described with respect to FIGS. 5A-5C. The sound projection device may be used to provide feedback information to the player. The movable trajectory device 722 may receive input, such as visual frame data, from the camera 724. In one embodiment, the trajectory device 722 may use the input received from the camera 724 to determine whether a shot was made or missed.

In a particular embodiment, the trajectory device 722 may allow a user to listen to music of their choice while using the training system. The trajectory device 722 may include a memory for storing music and programming logic for allowing a user to select music of their choice during a training session. A player's musical preferences and other preferred optional settings on the system may be stored by the system and associated with the player so that a player doesn't have to input their selection each time.

In one embodiment, the device may include one or more input ports for downloading music onto the system from a portable device, an interface that allows a user to use a portable music device, e.g., an MP-3 player, such as an IPOD™ by Apple™ (Cupertino, Calif.) with the system, an optical disk drive for playing optical disks storing music or a communication interface allowing music to be downloaded from a remote server. During a training session, a player's musical selection may be output via a sound projection device coupled to the training system 702. When feedback information is provided in an audio format, the feedback information and any musical output may be integrated to allow both to be discerned. For instance, when audio feedback information is provided, it may be over-laid on top of the musical output the volume of the background music or feedback information may be each adjusted up or down so that the feedback is heard. In another example, the audio feedback information may be output from a separate speaker than the music or from only one channel of a speaker system (e.g., right or left channel) when a stereo system is included.

In another particular embodiment, the camera 724 may be used to provide additional information about a body position and body mechanics of the player utilizing the training system 710. The camera 724 may capture a position or an alignment of a player's torso, head, arms, etc., during and/or after a shot. This information may be combined with information obtained from camera used in device 722. The trajectory device 722 may analyze the player's body position captured from the camera 724 and/or the camera in device 722 to provide additional feedback information and/or recommendations that allow a player to improve their shooting skills. The camera 724 and/or device 722 may be positioned at different locations to capture different visual data regarding a player's body position while still providing trajectory analysis and feedback. In some embodiments, such as when the camera 724 is not present, only the camera in device 722 may be used to gather visual data for an analysis of a player's body mechanics during shooting. In other embodiments, additional cameras, besides the camera 724 and the camera in device 722 may be used.

In analyzing a player's body mechanics, the trajectory device 722 may be used to determine a trajectory of one or more parts of the player's body during and after a shot. For example, the trajectory device 722 may determine an arc of a player's foot/or knee to determine whether the player move upwards in a vertically aligned direction or in a direction off of vertical. In another example, the trajectory device may measure an arc of a player's elbow or hand to determine whether the player's arms is imparting sideways momentum to the ball and to determine whether the player's is properly following through on the shot.

In one embodiment, during a training session comprising a number of shots, the body positioning information determined for each shot may be correlated with information characterizing the shot, such as trajectory parameters and the feedback information derived from the trajectory parameters. Thus, after or during a training session, the trajectory device 722 may analyze the shots, group them in some manner and then determine whether there are characteristics of each group related to a player's body mechanics that distinguish one group from the other group.

For example, during a training session, the trajectory device 702 may group a first number of shots a player has taken as good shots (e.g., shots with an arc within a proscribed range and made) and group a second number of shots as bad shots (e.g., shots with an arc out of a proscribed range that were made or missed). Then, the trajectory device 722 may compare the player's body mechanics for shots in each group to see if there are any characteristics that distinguish the shots in the good group from the shots in the bad group. For instance, in the bad group, the player may have had a poor follow through that resulted in a bad shot.

Information related to their shooting mechanics may be provided in some format to the player. For example, a player may be shown visual output for different shots in a side-by-side manner, in series (one shot, then another shot) or one on top of the other (e.g., overlaid) by making using graphical techniques to make one of the shots semi-transparent. When the shots have been grouped in some manner, then one shot from a first group and one shot from a second group may be shown for comparison. In addition, shot comparison may be shown for two or more shots made by a single player and also for two or more shots made by different players. For instance, a player may be able to compare their shot with the shot of one of their favorite professional players. The shots compared and output by the system may be for shots made during a current or previous training session using the training system.

The visual display device 716 or a display device on 722 may be used to display a comparison of the different shots. From the comparison, differences in the player's biomechanics between the shots may be evident. When the trajectory device has performed an analysis and determined a biomechanical difference between the shots, such as a poor follow through for shots in one group versus a good follow through for shots in another group, the differences may be illustrated on the display with additional graphics added to the previously captured visual data. For instance, the visual recording of the player's hand or arm may be highlighted with additional graphics, such as an added arc that follows the motion of the player's hand, to illustrate what is good or not good about the player's follow through.

The categorization of shots into groups, such as "good" shots and "bad" shots, may be also used to illustrate a player's training progress. During a training session or over multiple training sessions, utilizing the feedback information generated by the trajectory device 722, a player's biomechanics may naturally improve as they learn what a "good" shot feels like using the feedback information. Thus, the player may take more "bad" shots earlier in a session or in previous sessions using the device and then later improve to make more "good" shots. From a current and/or previous training sessions, the trajectory device 722 may categorize various shots and then show a comparison of shots from different groups, such as one or more "good" shots and one or more a "bad" shots. The player, coach or a trainer may be able to identify an improvement in their mechanics by visually comparing the selected "good" and "bad" shots.

The trajectory system 702 may be operable to output the visual comparison to a visual display device coupled to the system or a printer. In addition, the trajectory system may be operable to store visual data to a DVD or some other optical storage device. Further, the trajectory system 702 may be operable to store it to a local/remote memory for archival purposes, store it to a portable storage device, such as a thumb drive (e.g., portable hard drive or flash drive), to e-mail to a specified e-mail address or the like.

The criteria used to group good and bad shots is variable and may depend on one or more different trajectory parameters and their combinations as well as an analysis of a player's shooting mechanics and is not limited to the examples described above, which are provided for illustrative purposes. Thus, in some instances, a made shot with a good arc may be categorized a "bad" shot because of a player's poor shooting mechanics. Conversely, in other instances, a missed shot may be categorized as a "good" shot, because the shot had a good arc and the player used good shooting mechanics.

As described above, in some instances, the trajectory device 722 may perform an analysis of the player's biomechanics (shooting mechanics) in each shot an attempt to identify differences that led to the improvement and when the trajectory device 722 has identified differences, these may be illustrated graphically in some manner as part of the visual output. Further, the trajectory device 722 may use an analysis of a player's biomechanics to prescribe exercises or drills that could improve a player's shot. For example, the trajectory device 722 determines a player's biomechanics are off in some manner, such as a player is not following through properly on a shot with their hand or some other part of their body is moving in a less than optimal manner, then the trajectory device may recommend exercises to improve the player's determined deficiency.

A prescribed exercise to improve an identified proficiency of a player may or may not involve shooting. In the case of shooting, the trajectory device 722 may be programmed with various exercises. The programmed exercises may comprise types of shots jump, set or bank, distance of shots (e.g., 5 ft, 10 ft, free throw line, under the rim, from the side, etc.), number of shots, etc. For example, a prescribed shooting exercise might comprise 5 jump shots from the free throw line, followed by 5 set shots from the 3-point line. In regards to systems 700 and 702, details of shooting programs are described in further detail below.

Returning to FIG. 10, the trajectory device 722, may be coupled via a wired or wireless communication links to the backboard mounted camera 724 and visual feedback device 716. Further, the trajectory device 702 may include a communication interface or a mechanism for connecting to a communication interface that allows the trajectory device 702 to communicate with other trajectory detection, analysis and feedback systems, such as the system associated with training system 700.

Basketball training systems 700 and 702 may include bounding structures, such as 710, around the circumference of the playing areas 109. Although not shown, the bounding structures 710 may surround the playing areas 109 on four sides to form a rectangular box-like shape. The structures 710 may be secured in a fixed location and relatively rigid (e.g., like the walls of a racquet ball court) or removable and flexible made of various suitable materials, including materials that absorb impact. In particular embodiments, removable netting, curtains, partition walls with wheels, may surround a portion of or the entire circumference of the playing areas 109. Thus, for example, using movable curtains, a standard size basketball court may be partitioned into many smaller areas to allow the use of multiple basketball training systems and then later converted back to a standard size basketball court for game play.

An impact absorbent material may include padding to absorb an impact of a player or when the training system is adaptable for other sports, such as golf or baseball. The material may be designed to absorb impact of these objects, golf balls or baseballs, hitting the wall. Further, the material may designed to prevent ricochets of these objects from hitting the wall and then striking a player.

The dimensions, width 712 and length 714, of the basketball training area 109 may be significantly smaller than the length and width of a standard basketball court which is 84-94 feet long and 50 feet wide. For example, in FIG. 10, the length 714, may be proximately 26 feet which allows a pro 3-point shot of 23.75 feet to be taken and the width may be about 14 feet which is wider than the 12 ft lane of a basketball of a standard basketball court. Smaller or larger playing areas 109 with their associated dimensions may also be used and the present invention is not limited to the previous example. The lines of a standard basketball court, such as the free throw line which is 15 feet from the backboard 151 and 3 feet from the front of the rim may be also be incorporate as part of the playing areas 109.

In one embodiment, the width 712 doesn't have to be centered evenly on each side the basket 103. For example, on one side of the basket, the width 712 may be just larger than the lane, while on the other side of the basket 103, the width 712 may extend to the dimensions of a standard basketball. These asymmetric dimensions may allow shots to be taken from one side of the basket 103 that are of any length available on a standard basketball court. On the opposite side of the basket 103 some shots of a length available on a standard basketball court may not be available.

In the case where the width 712 of the playing area is significantly narrower than the width of a standard basketball court, in one embodiment of the present invention, the basketball training systems may include a rotation device 720. The rotation device 720 may be coupled to the backboard and its associated support in a manner that allows the backboard 151 and basket to be rotated between 0 and 90 degrees in one direction or between 0 and 90 degrees in two directions. The training systems, 700 and 702, may include input devices, such as a touch screen display, that allows an operator to select a shot program that includes or doesn't include a rotation of the backboard 151 during a training session.

The rotation device 720 may also be coupled to the backboard and its associated support in a manner that allows the backboard 151 and basket to be rotated between 0 and 90 degrees while keeping the position of the hoop constant, thus having the center of rotation being the center of the hoop. When a player moves around a hoop, the hoop remains in a fixed position. Thus, a better simulation of shooting on full-sized basketball court may be provided by rotating the backboard 151 in a manner that allows the hoop 103 to maintain a constant position in space as the backboard rotates. In one embodiment, a rotation through the center of the hoop 103 may be generated by placing the rotation mechanism 720 above the backboard with its axis of rotation through a center of the hoop 103 and then providing a connector bar of some shape from the axis of rotation of the rotation mechanism 720 to the back board 151. In this embodiment, when the rotation mechanism 720 is engaged, the position of the hoop 103 will appear to remain constant because the hoop 103 and the backboard 151 rotate around the center of the hoop 103.

The rotation device may be coupled to a logic device utilized by the training systems 700 and 702, such that the backboard 151 and goal 103 are rotated automatically during a training session on the training systems. When the backboard and basket are rotate, the training systems are operable to perform trajectory analysis and provide feedback information while accounting for the changing orientation of the backboard 151 and basket 103 as a function of time. At start-up and/or during operation, the training systems may perform calibration functions with the backboard and basket 103 at different positions to check if the system is properly set-up.

Besides rotation, the backboard may be capable of vertical motion. For instance, for younger players, the mechanism 720 may also allow the backboard 151 and basket 103 to be lowered. Further, young players may use a smaller ball. Thus, the training systems, 700 and 702, may be operable to provide trajectory analysis and feedback for basketball hoops at various heights, at changing angles and for balls of different sizes.

In particular embodiments, the basketball training systems 700 and 702 may include ball return mechanisms. The ball return mechanism may be a passive device that alters the momentum but doesn't add to the momentum that the basketball possesses when it reaches the device. For instance, the curved ramp 706 alters the momentum of a basketball, such as 160, such that it is directed away from the basket 103. As shown in the figure, the curved ramp 706 won't typically alter the trajectory of basketball if it is a missed shop. Other passive devices, such as netting, may be employed to direct a ball away from the basket 103 for missed shots.

The ball return mechanism may also be an active device that adds momentum to balls and directs them toward a player. For instance, in training system 702, an active ball return device 740 is used that receives both made and missed shots and then shoots out a basketball. The ball return mechanism 740 may be operable to hold a plurality of basketballs.

The ball return mechanism 740 is coupled to netting 708 that directs both missed and made shots to the ball return mechanism. One advantage of using a playing area 109 that is smaller than a standard basketball court with bounding structures 710 around the perimeter of the playing area 109 is that the bounding structures 710 constrain the balls allowing the netting 708 to be placed below the backboard 151. Without the bounding structures to constrain the balls, such as on a full-size court, the netting 710 has to be placed higher than the hoop to capture a majority of missed shots. When netting is higher than hoop, it blocks the player's view and it doesn't simulate actual playing conditions which is undesirable to players. Another advantage of a smaller playing area is that it allows more training systems to be utilized in a smaller area, which may be more economically and advantageous for facilities that are space constrained. For example, 4 training systems might be placed in the width of a standard basketball court and its sidelines.

In one embodiment, the ball return mechanism may include controls that allow the ball to be returned to different spots on the playing area 109. For instance, the device 740 may be coupled to a motor that allows the device to be rotated and/or elevated to direct balls to different locations. Similar, to the rotation device 720, in some embodiments, the location where the ball is passed may be automatically controlled by the training system 702 as part of a shooting program or the location may be manually adjusted. The active ball return feature may allow the player to perform "catch" and "shoot" exercises during their training session where the player receives a "pass" from the return device 740 at one or more different locations on the playing area and then shoots after receiving the pass.

The training systems, 700 and 702, as part of training session, may be operable to direct a player to particular locations on the playing areas 109 as part of a shot program. As an example, as part of a shooting program, the trajectory systems, 700 and 702, may direct players to locations 730, 734, 736 and 738. The player may take one or more shots at each of these locations as part of a shooting program.

A number of different methods may be used to direct a player to different locations. In one embodiment, locations on the playing areas 109 may be marked in some manner, for instance, each of the circles 730, 734, 736 and 738 may be painted a different color or painted with a number and the training system may provide an audio command, such as "blue," "free throw line," "3-point line," or "one," to direct a player to a particular location. In another embodiment, a visual display device such as 716 may include a map of the playing area. When the player is directed to change location, a sound or command, such as "change location" may be output via a sound projection device and then a location on the map of the playing area may be indicated in some manner.

In yet another embodiment, lights may be integrated into the floor of the playing areas 109. For example, lights may be integrated at locations 730, 734, 736 and 738. These lights may light up under control of the training system to indicate different shooting locations. In a particular embodiment, the training systems may include a movable spotlight or a projection device, such as 728, that projects visible light or an image to certain locations on the playing area 109, such as 730, 734, 736 and 738. The training systems may automatically control the movable spotlight or projection device(s) as part of a shooting program.

The training systems, 700 and 702, may be operable to determine whether a player is shooting from a particular location. For example, when a machine vision system is used for the trajectory analysis and feedback, the machine vision location may be also used to determine from which the location the player has shot on the playing surface. As another example, the playing area may include sensors for detecting a player's location, such as an integrated pressure sensor or a light sensor that is activated when it is partially covered by a player's foot. In addition, the player may wear a device, such as a wireless device that allows their location on the player area 109 to be determined.

The system may also be operable to compare the player's actual location (determined by the system) with a location where the player is supposed to be located as part of a shooting program. The location detection system may look for the player's feet to be within and/or touching a circle of some specified radius. When the player's actual location is different from the location from where they are supposed to be located as part of a shooting program the system may output instructions or information, such as "not at specified location." If the system is scoring the player's performance in a shooting program, then shots from incorrect locations may affect the player's score. The locator function may or may not be active as part of a shooting program.

As part of a shooting program, a player may be able to compete against one or more players in a tournament. The training systems 700 and 702, which may be systems at the same or different locations, i.e., at the same facility, such as a gym or at different facilities, such as different gyms in different cities, may be operable to send data to other training systems and receive data from other training systems. The training systems 700 and 702 may be operable to communicate with one another and other training systems or another device providing remote communications via a local area network or a wide area network, such as the Internet. Thus, in particular embodiments, each system may include a network communication interface that allows for one of a wired or wireless connection to one or more of the local area network or the wide area network.

In one embodiment, two or more players may start a shooting program at the same time, which is scored in some manner. For example, a player may be awarded points for shots made as well as an amount of time taken to complete the drill. In FIG. 10, player "A" using system 700 is competing against player "B" using system 702 and each system is sending data to one another. In the FIG. 10, a time left and a score for their competition is shown on the visual displays 716.

To generate a competition, two or more players don't necessarily have to use a training system at the same time. For example, a first player may participate in a shooting program where there results are recorded, such score as a function of time. Later, a second player may compete against the first player using their recorded data and the same shooting program that the first player used. As the second player goes through the same shooting program as the first player and generates a score, the first player's scores at corresponding times may also be shown. Using this approach, a player may also compete against themselves by repeating a shooting program and competing against results of the shooting program that they have previously generated.

The competition results may be shown on the visual display 716. In one embodiment, the system may store an archive of top "scores" or player's of interest, such as "pro" players that a player can compete against. Further, the systems may be operable to allow players to compete over time or against one another in a league type format.

In other embodiment, the backboard and basketball may be replaced with images projected onto the wall of the bounding structures 710 and into air, i.e., space between the bounding structures. The system may include blank walls and floors that are suitable for image projection. For projecting into the space between the bounding structures, a number of technologies exist. For instance, IO2 technology (S. San Francisco, Calif.) provides a "helio" display that allows an image to be displayed on a "sheet" of compressed air. Thus, various compressors for providing sheets of air at different location may be integrated into the system. A sheet of compressed air at the height of basket 103 in combination with a projector may be used to generate a projection of a hoop that a player may use as a target. Technology for generating 3-D spots of plasma in air has also been demonstrated by The National Institute of Advanced Industrial Science and Technology, in Japan.

Using the "helio" display or plasma generation technology or some other suitable projection technology, a hoop may be generated in 3-D space and lines on a backboard projected on to one wall. The player may shoot the ball towards this projected hoop where the system is operable to determine whether the ball has passed through the hoop or not. A missed shot may be result in a projection of a rebound from the hoop projected into to space while the "physical" ball bounces to the ground. Further, an audience may be simulated on the walls and other players to provide a more authentic experience.

In another embodiment, a player may where goggles or head gear that project images or lines into space. These images or lines integrated into a player's field of view. Thus, a virtual basketball and backboard may be projected into the player's field of vision and the player may shoot the ball towards the image projected using the goggles. The goggles may be used in conjunction with head and/or eye tracking to provide a player with the proper views. For instance, wearing the goggles, the player may turn away from the virtual basketball hoop and the image of the hoop will no longer be displayed to the player. This type of application may also be referred to as a "mixed" reality. Mixed Reality is the merging of real world and virtual worlds to produce a new environment where physical and digital objects can co-exist and interact.

Using a projection and/or goggle system, the basketball training system may be easily adapted to other sports. For instance, a virtual hoop or hoops could be used as targets for football training system. A similar environment could be used for pitching a baseball, fielding a baseball and throwing to first base, hitting a baseball from a pitching machine, throwing a pass, hitting a tennis serve, hitting a volleyball serve or spike, etc. The first base or running receiver/defenders or tennis net/lines or volleyball net/lines would be 3-D projections. Further, physical games may be played in this generic environment against competitors that are virtual (computer generated or real people over the network.) The trajectory analysis and feedback system may provide the trajectory of the object, thus providing feedback for training or calculating gaming expertise for scoring. The system may allow data to be stored and retrieved or displayed to an audience.

Figure 11:
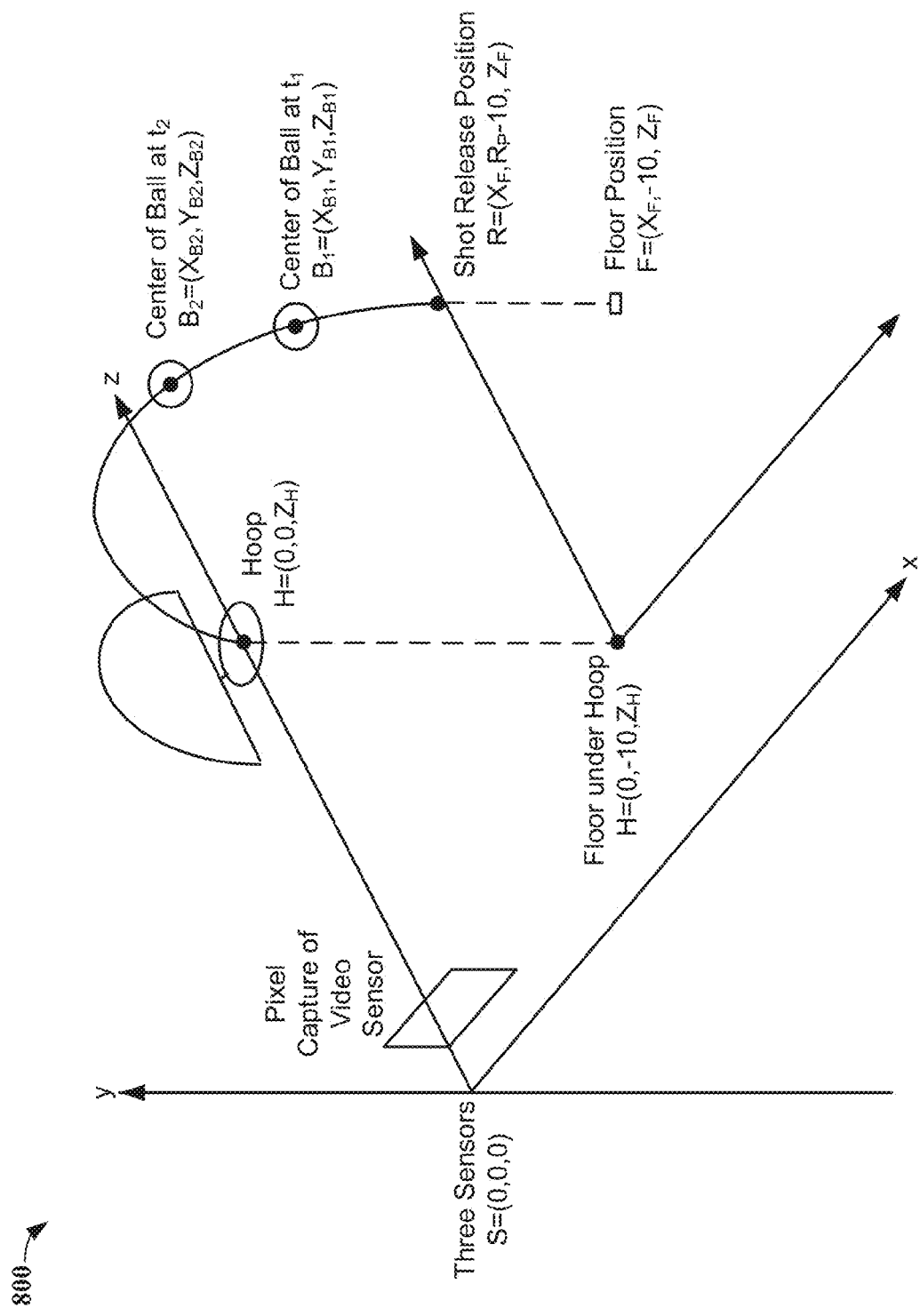
FIG. 11 is an example of a system including three sensors.

FIG. 11 is an embodiment of a system 800 including three sensors. The system has video sensors, a motion sensor, and a distance sensor at one point off to one side of the hoop. All sensors operate off a single clock and feed all date to a single calculation engine. This could be a Firewire feed into a mobile computer. Then, the feedback could be communicated either through the mobile computer speakers or on the mobile computer display. Electrical power will be provided through the Firewire feed from the mobile computer battery which could be recharged from any AC source.

Use method could be as follows. Camera is mounted in a fixed position. Height of camera and distance from camera to hoop is known. True horizontal calibration points from the hoop are known. Lens is calibrated to provide known translation from pixel position to true object position. Motion sensor is mounted at camera position and detects motion above rim height. Distance sensor is mounted at camera position and detects distance from the camera at a known time when the ball is about ten feet from the hoop. (This is possible if the three sensor system is mounted about thirty five feet from the hoop with a 15° conical total angle). Two distance sensors may be needed in order to cover the court at all positions where the ball is 10 feet above the floor.

At practice time the link to the three sensors is connected to the battery powered mobile computer. The computer is booted which activates the three sensors, the frame grabber, the calculation software, and the display/sound driver. The shooter takes his shots from any position on the half court and receives immediate feedback on entry angle and entry position. The mobile computer also stores the full series of shots from the practice session.

After the practice session, the sensors are disconnected from the mobile computer. Sensors are left in place. Mobile computer is taken away to recharge batteries and to review data from this or previous practice sessions.

As shown in FIG. 11, assume at $t_1$ the ball height passes y<0 (i.e., 10' off the floor). Motion sensor senses ball and triggers video and distance sensors on a common clock. Assume at $t_2$, y is approximately equal to 0. Both the video and distance sensors capture data. $d_{B2}$+radius is the true distance from sensor S=(0,0,0) to ball center $B_2=(X_{B2}, Y_{B2}, Z_{B2})$. h (y) is the height of the hoop as captured on the video sensor. $b_2$ (y) is the height of the ball as captured on the video sensor. h (x) is the horizontal position of the hoop captured on the video sensor. $b_2$ (x) is the horizontal position of the ball as captured on the video sensor.

Then, $B_2$ is calculated. From h(y) and $b_2$(y), calculate $Y_{B2}$ using direct conversion as modified by lens calibration. From h(x), $b_2$(x) and $db_2$+ball radius, calculate $X_{B2}$ and $Z_{B2}$. Therefore, $B_2+=(X_{B2}, Y_{B2}, Z_{B2})$. Then, mathematically transform $B_2(X_{B2}, Y_{B2}, Z_{B2})$ into $B_2(X^1_{B2}, Y_{B2}, \theta_{B2})$ where the center of the hoop is the origin S=(0,0,-). $X^1_{B2}$ is the true horizontal distance in the X-Z plane from S to $B_2$, $\theta_{B2}$ is the floor angle where 0° is all points directly to the right of the origin, 90° is directly in front of the hoop and 180° is all points directly to the left of the origin. $Y_{B2}$ is unchanged and needs no transformation.

Capture additional video sensor data $b_3$, $b_4$, $b_5$ ... at times $t_3$, $t_4$, $t_5$ ... having greater than or equal to five points with at least two points just before the ball enters the hoop. Transform all $B(X_B, Y_B, Z_B)$ into B $(X^1_{B1}, Y_{B1}, \theta_B)$. Then do a parabola curve fit on $X^1_B$-$Y_B$ pairs. Calculate the entry angle and entry position from the curve fit coefficients in $Y=(Ax^1)^2+Bx^1+C$. Calculate $R^2$ of the curve fit to check for acceptable fit. Calculate floor position $F(X^1, \theta)$. $F(\theta)$ is the same as $B(\theta)$ and needs no transformation $F(X^1)$ is calculated by solving parabolic equation for $X^1$ when y=release height of the shooter −10 feet. The parabola will yield two solutions for $X^1$, but we only need the solution for a positive $X^1$.

Although the foregoing invention has been described in some detail for purposes of clarity of understanding, it will be apparent that certain changes and modifications may be practiced within the scope of the appended claims.

What is claimed is:

1. A system comprising:
 a camera configured to capture images including a body location on an individual playing a game as a function of time;
 a distance sensor, physically proximate to the camera, the distance sensor having an emitter configured to emit light and a detector configured to detect the light after reflection of the light from the body location, wherein the distance sensor is used to determine, based on the detected light, a distance from the camera to the body location as the function of time; and
 a processor, coupled to the camera and the distance sensor, configured to 1) receive the images, 2) based upon image data associated with the images, determine a pixel position of the body location as the function of time, 3) receive sensor data from the distance sensor, 4) based upon the sensor data, determine a distance from the camera to the body location as the function of time, 5) based upon the distance from the camera to the body location as the function of time and the pixel position of the body location as the function of time, generate a three dimensional position representative of a motion of the body location in physical space as the function time and 6) based upon the three dimensional position of the body location as the function of time in physical space, determine an input parameter for a video game.

2. The system of claim 1, wherein the processor is further configured, based upon the three dimensional position of the body location as the function of time, to generate a parameter that characterizes the motion which helps the individual to improve a skill associated with playing the game.

3. The system of claim 1, wherein the processor is further configured, based upon the three dimensional position of the body location as the function of time, to generate a parameter that characterizes the motion which helps the individual to assess body mechanics of the individual while playing the game.

4. The system of claim 3, wherein the generated parameter is associated with a consistency of the motion when the motion is repeated a plurality of times.

5. The system of claim 1, wherein the processor is further configured to, based upon image data associated with each image, determine a second pixel position of an object, separate from the body location, as the function of time, based upon the sensor data, determine a second distance from the camera to the object as the function of time, based upon the second distance from the camera to the body location as the function of time and the second pixel position of the object as the function of time, generate a three dimensional position representative of a motion of the object in physical space as the function time.

6. The system of claim 5, wherein the object is one of a ball or a piece of sports equipment used to play the game.

7. The system of claim 1, wherein a lens of the camera is calibrated to provide a translation from the pixel position to a physical position in two dimensions.

8. The system of claim 1, further comprising a housing, wherein said processor is located in an interior of the housing, and wherein the camera and distance sensor are mounted to an exterior portion of the housing.

9. The system of claim 8, wherein the housing is portable.

10. The system of claim 1, further comprising a touch screen display configured to receive touch inputs used to operate the system and configured to output, under control of the processor, a graphical representation of the motion.

11. The system of claim 1, further comprising a microphone wherein the processor is further configured to receive microphone data from the microphone, based upon the microphone data, detect a voice command and operate the system in accordance with the voice command.

12. The system of claim 1, further comprising a wireless interface wherein the processor is further configured to store to a memory and to transmit the position of the body location in physical space as the function of time to a remote device via the wireless interface.

13. The system of claim 1, wherein the images and the sensor data are recorded while the individual is participating in a training session associated with playing the game.

14. The system of claim 1, wherein the processor is further configured to identify in the images an object of known physical dimensions with a stationary position used to play the game.

15. The system of claim 14, wherein, based upon the known physical dimensions of the object, the processor is configured to determine the distance from the camera to the object.

16. The system of claim 14, wherein processor is configured to auto-calibrate the system based upon the object identified in the images.

17. The system of claim 1, further comprising a motion sensor, coupled to the processor, configured to detect motion of the body location.

18. A system comprising:
a camera configured to capture images including an object associated with an individual playing a game as a function of time;
a distance sensor, physically proximate to the camera, the distance sensor having an emitter configured to emit light and a detector configured to detect the light after reflection of the light from the object, wherein the distance sensor is used to determine a distance from the camera to the object as the function of time;
a motion sensor, physically proximate to the camera, used to detect motion as a function of time;
wherein the camera, the distance sensor and the motion sensor are related to a single clock; and
a processor, coupled to camera, the distance sensor and the motion sensor, configured to receive the images, to receive first sensor data from the distance sensor and second sensor data from the motion sensor and based upon image data associated with each of the images, the first sensor data and the second sensor data, generate a three dimensional position representative of the motion of the object in physical space as the function time.

19. The system of claim 18, wherein the motion sensor is an accelerometer.

20. The system of claim 18, wherein the processor is configured to determine an input parameter for a video game based on the three dimensional position.

21. The system of claim 1, wherein the light emitted by the emitter is infrared light.

22. The system of claim 21, wherein images captured by the camera are based on visible light received by the camera.

23. A method comprising:
capturing images by a camera thereby defining image data indicative of the images, the images including a body location on an individual playing a game as a function of time;
emitting light from a distance sensor;
sensing the light by the distance sensor after the light has reflected from the body location;
determining a distance from the camera to the body location as the function of time based on the sensing;
based upon the image data, determining a pixel position of the body location as the function of time;
based upon the distance from the camera to the body location as the function time and the pixel position of the body location as the function of time, generating a three dimensional position of the body location in physical space as the function of time; and
providing an input parameter for a video game based upon the three dimensional position.

24. The method of claim 23, wherein the emitted light is infrared light.

25. The method of claim 24, wherein the capturing comprises detecting visible light, and wherein the image data is based on the visible light.

* * * * *